US006996372B2

(12) United States Patent
Noerpel et al.

(10) Patent No.: US 6,996,372 B2
(45) Date of Patent: Feb. 7, 2006

(54) MOBILITY MANAGEMENT-RADIO RESOURCE LAYER INTERFACE SYSTEM AND METHOD FOR HANDLING DARK BEAM SCENARIOS

(75) Inventors: Anthony Noerpel, Lovettsville, VA (US); Wei Zhao, Germantown, MD (US); Fei Yang, Columbia, MD (US); Kennon Cogdell, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 606 days.

(21) Appl. No.: 10/185,256

(22) Filed: Jun. 28, 2002

(65) Prior Publication Data

US 2003/0045241 A1 Mar. 6, 2003

Related U.S. Application Data

(60) Provisional application No. 60/317,560, filed on Sep. 6, 2001.

(51) Int. Cl.
H04B 7/185 (2006.01)
(52) U.S. Cl. .................... 455/67.1; 455/12.1; 455/434; 455/435
(58) Field of Classification Search ............... 455/67.1, 455/12.1, 434, 435, 427, 428, 430; 709/203; 725/105
See application file for complete search history.

(56) References Cited

U.S. PATENT DOCUMENTS

| 5,799,153 | A | * | 8/1998 | Blau et al. ................... 709/223 |
| 6,389,037 | B1 | * | 5/2002 | Do ............................. 370/469 |
| 2001/0051981 | A1 | * | 12/2001 | Davison et al. ............. 709/203 |
| 2002/0184642 | A1 | * | 12/2002 | Lude et al. .................. 725/105 |

* cited by examiner

Primary Examiner—Nay Maung
Assistant Examiner—Tan Trinh
(74) Attorney, Agent, or Firm—Craig Plastrik

(57) ABSTRACT

A method is presented describing how information and data is exchanged between a user's access terminal's mobility management and radio resource software layer in a satellite based telecommunications system, wherein the telecommunication system comprises one or more satellites, new and existing gateways, and a user's access terminal, which comprises a mobility management and radio resource software layer, the method pertaining to data and information flow between them, in response to various stimuli and conditions as the user enters into and out of various modes of operations, including deactivation, activation and illumination of a dark beam of a spot beam that is a shared resource.

10 Claims, 14 Drawing Sheets

MOBILITY MANAGEMENT-RADIO RESOURCE LAYER INTERFACE SYSTEM AND METHOD FOR HANDLING DARK BEAM SCENARIOS

This application claims benefit under 35 U.S.C. §119(e) from provisional patent application Ser. No. 60/317,560, filed on Sep. 6, 2001, the entire contents of which are incorporated herein by reference.

FIELD OF THE INVENTION

The present invention relates to cellular and satellite communications. More particularly, the invention relates to a method and system of sharing radio resources between at least one existing service provider and a second existing or new service provider, to provide both new and existing services to their respective users.

BACKGROUND OF THE INVENTION

Great advances in the field of wireless communications have been made over the past ten to twenty years, and continue to be made. These advances both improve the quality of communication, e.g., the clarity and reliability of communication, and improve the geographic coverage of such wireless communications. As industry strives to provide a wireless communications capability that covers the entire globe, factors such as economic viability dictate that space-based transceivers be employed to compliment ground infrastructure. Ground infrastructure remains technologically advantageous and economically preferable in identified population centers where a great deal of bandwidth is required in a relatively small area. However, satellites can provide universal coverage economically extending coverage over less populated areas. Thus, two types of wireless communication, i.e., ground infrastructure cellular, and space-based satellite systems have emerged. One of the most ubiquitous terrestrial cellular systems is the Global System for Mobile Communications (GSM). Geo Mobile Radio (GMR-1) is an example of systems which are extensions of GSM to the mobile satellite communication system venue.

In both types wireless communication systems, there are physical channels and logical channels. A physical channel in GSM or GMR-1 is a continuous allocation of resources including both a frequency and a time component. The frequency is given by an absolute radio frequency channel number (ARFCN) allocation, and the time component is given by the allocated time slot(s) within a frame. Logical channels are mapped to physical channels. Logical air interface channels of interest include: broadcast control channel (BCCH) 5 (from network to a user access terminal or forward direction); random access channel (RACH) 19 (from user access terminal to network or return direction); and access grant channel (AGCH) 21 (forward direction). The network uses logical channels to convey signaling and control message. For example, system information messages are conveyed on the BCCH 5, channel request messages are conveyed on the RACH 19 and immediate assignment reject and immediate assignment messages are conveyed on the AGCH 21. Messages contain information elements and information elements can have many different values.

FIG. 1 illustrates a block diagram of a satellite communication system according to the prior art. A satellite communications network, such as a geo-synchronous earth orbit mobile communications network, comprises at least one geo-synchronous earth orbit satellite 6, a ground-based resource manager (RM) 16 and spacecraft operations center (SOC), associated with satellite 6, at least one ground-based existing gateway station (EGW) 8, and at least one user access terminal 20, which is typically a hand-held or vehicle mounted mobile telephone. Satellite 6 enables access terminal 20 to communicate with other access terminals 20 or with other telephones in a terrestrial network (for example, a public switched telephone network or PSTN), via the gateway stations. RM 16 provides system-wide resource management, and the SOC controls on-orbit satellite operations for its respective satellite 6. A system may comprise one or more satellites 6.

In a terrestrial cellular system an antenna's coverage area (both receive and transmit) is known as a cell. The equivalent concept in a mobile satellite system is a spot beam. The spot beam is defined as the coverage area of a satellite antenna or antenna subsystem, which may consist of a phased array or a multiplicity of antenna elements with or without a reflector. The typical mobile satellite may have hundreds of spot beams. A "cell" or "spot beam" is defined to exist independent of whether or not it is actually radiating or receiving energy at the time. Thus, we can define an illuminated spot beam as a beam into which energy is actually being radiated by the antenna and a dark spot beam as a beam in which the satellite's antenna is not radiating any energy or a signal. More specifically, the transmission of BCCH 5 into the cell or spot beam is required.

The spot beam in FIG. 1 shall be referred to as spot beam 10. BCCH 5 contains the system information necessary for access terminal 20 to receive so that it can be aware of the cell or spot beam's 10 existence. In GSM cellular technology specifications an access terminal is referred to as a "mobile station" (MS). In the GMR-1 mobile satellite specifications an access terminal is referred to as a "mobile earth station" (MES). For generality, the term "access terminal" 20 will be used in this document The system information messages broadcast by the network on the BCCH 5 contain the information necessary for access terminal 20 (as shown in FIG. 1) to determine where the RACH 19 and AGCH 21 channels are (timeslots and ARFCNs) and any rules governing the use of the RACH 19 channel by access terminal 20. In GSM and GMR-1, RACH 19 channels and AGCH 21 channels are paired so that an access terminal's channel request message on a specific RACH 19 will always be responded to by an immediate assignment or immediate assignment reject message from the network on the specific paired AGCH 21. The system information messages broadcast on the BCCH 5 channel also contain information elements which describe the service provider bearer services which are offered to access terminal 20 within the spot beam or cell. A GMR-1 BCCH 5 also contains a concurrent BCCH list, which is a list of BCCHs 5 being broadcast into the same spot beam 10 by the network and their services and service providers. Except for the concurrent BCCH list, all of this information or its equivalent exists in GSM. All of the information which the terminal needs to know in order to operate within the system is contained in the system information messages.

GMR-1 05.005 and GSM 05.05 partition the radio frequency spectrum available to the air interface into radio frequency channels, and defines an ARFCN for each channel. Each spot beam in GMR-1 (or cell in GSM) is allocated a subset of these channels. These channels process are defined as the beam allocation. One radio frequency channel of the beam allocation is used by the network to broadcast the BCCH and is known as the BCCH carrier.

GSM and GMR-1 use time division multiplexing (TDMA). Time is partitioned into TDMA frames and timeslots as defined in GMR-1 05.002 and GSM 05.02. The transmissions within these timeslots are known as bursts. A burst is a single unit of transmission on the radio path defined in terms of center frequency (or ARFCN), bandwidth, power profile, and duration (in numbers of contiguous timeslots).

Logical channels are mapped to physical channels by a set of multiplexing rules. They can be statically or dynamically mapped to physical channels. These At present, the typical mobile communications satellites are non-processing satellites or bent-pipe satellites. That means that all physical bursts are transmitted or originated by a ground-based transmitter, either an access terminal 20, EGW 8 or new gateway (NGW) 12, and these are received and retransmitted by the satellite. Satellite 6 does not initiate transmission or originate physical bursts. Typically, there is a radio frequency spectrum allocated to the link between access terminal 20 and satellite 6 and another radio frequency spectrum allocated to the feeder link between satellite 6 and EGW 8. If EGW 8 transmits a burst on the feeder link, satellite 6 receives the burst and performs a frequency translation from the feeder link frequency to an appropriately allocated ARFCN and retransmits the burst on the forward link ARFCN into spot beam 10. If no feeder link burst is present satellite 6 has no signal to retransmit. Also, if access terminal 20 transmits a burst on an appropriately allocated ARFCN return link, satellite 6 receives the burst and performs a frequency translation to the appropriately allocated feeder link frequency and retransmits the burst from access terminal's 20 signal to EGW 8.

When an access terminal 20 is turned on or powered up it searches for a BCCH 5 broadcast in a spot beam 10. Since there can be hundreds of spot beams 10, the access terminal 20 must perform a task called spot beam selection. Spot beam selection in GMR-1 is described in GMR-1 specifications 03.022 and 05.008 and in U.S. Pat. No. 6,233,451, "SPOT BEAM SELECTION IN A MOBILE SATELLITE COMMUNICATION SYSTEM", (the entire contents of which are expressly incorporated herein by reference). Spot beam selection is the selecting of a BCCH carrier to "camp-on", which combines comparison and selection based on received signal strengths of BCCH carriers with a comparison and selection based on service provider or PLMN identity. Briefly, In GSM, access terminal 20 measures the power in all the BCCH carriers and selects all the ones with received signal strengths greater than some criteria and creates a rank-ordered list. The access terminal 20 then reads the system information broadcast on the BCCHs 5 of the BCCH carriers in the rank-ordered list and selects the one, which has a preferred service provider or PLMN. This is often not the closest cell or the strongest signal.

In GMR-1, in order to conserve satellite power and access terminal 20 power during communications, it is important that the access terminal 20 always select the correct spot beam. To assist the access terminal 20, two lists are broadcast in the system information of each BCCH 5, the neighbor list and the concurrent BCCH list. The neighbor list is a list of BCCH carriers used in the adjoining spot beams 10. The access terminal 20 makes measurements of these neighbors for signal strength comparison. The concurrent BCCH list is a list of all BCCH carriers in the same spot beam. These may be from a different EGW 8 or NGW 12. The concurrent BCCH List includes the PLMN ID, which is the service provider identity of the operator of the system broadcasting the concurrent BCCH. The PLMN ID is referred to as the "public land mobile network identifier" and it is composed of a mobile country code (MCC), and a mobile network code (MNC). The access terminal 20 avoids measurement comparison of concurrent BCCH carriers to make a spot beam selection, however once the access terminal 20 selects a spot beam 10, it compares PLMN identities of each BCCH 5 on the concurrent list and "camps-on" the BCCH carrier with a preferred PLMN.

As a further innovation of GMR-1, the access terminal 20 has incorporated a Global Positioning System (GPS) receiver. The system information message in the BCCH 5 also contains the latitude and longitude of the spot beam 10 center. Access terminal 20 may optionally compare its GPS position to the spot beam center position to accurately determine the correct spot beam. Since access terminal 20 is required to report this position in the channel request message, the network may optionally redirect the access terminal 20 to a different spot beam 10 based on a comparison of the reported access terminal 20 position and the coverage area map of all spot beams 10.

In order to support ubiquitous service throughout the satellite's coverage area, a gateway (EGW 8 or NGW 12) must broadcast a BCCH (BCCH 5 and BCCH 5', respectively) into every existing spot beam 10. This means that the RM 16 must allocate at least one BCCH 5 carrier for each spot beam 10 for use by the gateway RM 16. Further, satellite power must be allocated for each spot beam 10 to be illuminated by the gateway with a BCCH 5 (or BCCH 5') transmission.

Having selected a spot beam 10 and a BCCH carrier, the access terminal 20 must transmit a channel request message on the RACH 19 (or RACH 19') channel to request a traffic channel for communication of user data and/or signaling. Prior to transmitting this message, however, the access terminal 20 must make one more check. It must read the cell-bar-access bit in the system information to determine if access terminals are barred from attempting access to the cell or spot beam. If this bit is '1' access is barred and if the bit is '0' access is permitted. In the case assess is permitted, the access terminal 20 would request a channel with the establishment cause "to register". The definition of the cell bar access bit is shown in Table 1. If the user subsequently wanted to make a phone call, the access terminal 20 would request a channel for that purpose with establishment cause "to originate a call". Alternatively, someone in the PSTN might call the user, in which case, having registered with the network, the network knows the location, cell or spot beam and can page the access terminal. Upon receiving a page, the access terminal 20 transmits a channel request message with establishment cause "responding to a page." Other establishment causes exist.

TABLE I

| Cell Bar Access | Any Service |
| --- | --- |
| 1 | Barred |
| 0 | Not Barred |

In the prior art of GSM and other cellular and mobile satellite systems, the channel request message typically only contains a random reference and an establishment cause. A random reference is a unique random number generated by access terminal 20 and passed to the gateway within the RACH message, and which uniquely identifies that access terminal 20. It is used by the gateway to address access terminal 20 when sending the immediate assignment or immediate assignment reject message to access terminal 20 on the AGCH 21 (or AGCH 21'). This is used in the event of contention, between a first and second (or any number of) access terminals 20. As we have seen, the establishment cause tells the gateway the reason the access terminal 20 is requesting a channel (i.e., the reason to "establish" a channel). An innovation, introduced in the prior art of GMR-1, is for the channel request message to contain much more detailed information about the establishment cause and the requesting access terminal 20. The GMR-1 channel request message contains, in addition to the establishment cause and random reference, the SP/HPLMN ID (Service Provider/Home Public Land Mobile Network), the called party number, the GPS-derived position of the access terminal 20 and other information elements. The network reads all of these information elements and determines the disposition of the channel request message from access terminal 20. Any of the values of these information elements may trigger existing gateway (EGW) 8 to process access terminal's 20 request for access in a specific way, such as setting up a terminal-to-terminal call (described in GMR-1 specification 03.096) or optimally routing the call to another EGW 8 (described in GMR-1 specification 03.097) or rejecting the call based on geographic location, (described in GMR-1 specification 03.099) etc. None of these services are offered in GSM and there is no comparable specification.

U.S. Pat. No. 6,249,677, (the entire contents of which are herein expressly incorporated by reference), is entitled "Apparatus and Method for Delivering Key Information of a Channel Request Message From a User Terminal to a Network" and discloses an apparatus and method, for use with the satellite-based communications network, for improving the reliability and speed at which communication between a user terminal and the network is established. The apparatus and method arranges data of a channel request message transmitted from a user terminal to a satellite in the satellite-based network to insure that the most critical data for establishing communication between the user terminal and the satellite-based network is received at the satellite during the appropriate receiving time frame window. The channel request message includes a first data group necessary for establishing a communication link for which information is transmitted between the apparatus and the network, and a second data group including information for decreasing the amount time necessary to establish the communication link. The first data group is positioned at the center of the Channel Request Message, with portions of the second data group at opposite ends of the Channel Request Message. The time at which the user terminal transmits the Channel Request Message is set based on a location of the apparatus within a spot beam, to take into account the appropriate propagation delay time for the message to travel from the apparatus to the satellite in the network, thus assuring that at least the first data group of the Channel Request Message is received at the satellite during an appropriate receiving time frame window.

FIG. 2 illustrates a message flow diagram showing the establishment of a communications channel between an access terminal and the network according to the prior art. As discussed above, EGW 8 continuously transmits BCCH 5 (step 202), which contains system information messages. In step 204, access terminal 20 "camps on" BCCH 5, and retrieves the critical system information. Included in this system information is the frequency identity of the RACH 19 channel which access terminal 20 may use to communicate with EGW 8. For example, access terminal may transmit a channel request message to EGW 8 in order to access existing services. Upon receiving the channel request message from the access terminal 20 on the RACH 19 (step 206) the network responds with either an immediate assignment or an immediate assignment reject message on the AGCH 21 (step 204). Communication on a traffic channel may then begin, as shown in step 210.

As described, in order to offer wireless mobile service, a network or system must advertise its presence and capabilities via system information messages broadcast on the BCCH 5. This broadcast costs resources to a service provider. These resources include spectrum, power as well as radio equipment. When there are two gateway stations serving the same spot beam 10, each gateway stations must use an RF carrier as the BCCH carrier and each gateway station must broadcast the BCCH 5 continuously, in order for the access terminal 20 to discover and read the system information on the BCCH 5 and access services (step 210) from the gateway. Both gateways must illuminate their BCCH carriers.

A new service provider or the existing service provider, launching a new service, is normally required to spend resources to broadcast the system information associated with the new service. In order to support ubiquitous service in the entire coverage area of the satellite system, by the prior art, the NGW 12 must broadcast a BCCH 5 in every spot beam. This requires the allocation of at least one BCCH carrier for every spot beam 10, an allocation of satellite power for every spot beam 10, and the allocation of other required system resources, such as transmitters sufficient to support the transmission of a BCCH 5 in every spot beam 10 by NGW 12. Accordingly, a need arises to allow an existing service provider, which is already providing ubiquitous service, to support by proxy a second service provider and/or a new service. Such as capability offers the opportunity to save system resources. However, a method is required, which minimizes the impact to the existing proxy network, and at the same time requires no modifications to the user access terminal 20 already using the proxy network for existing services, and minimal modifications to a new access terminal 20 and existing gateway station equipment.

FIG. 3 illustrates a state transition diagram for a GSM/GPRS mobility management software layer according to the prior art. In GPRS, GMM V.02 state machine provides two major states: GMM-Deregistered and GMM-Registered. In the design of access terminal 20, the software that controls a microprocessor, which in turn controls the transceiver and I/O functions of access terminal 20, is divided into several or more layers. Generally speaking each of these "layers" are related software code, responsible for accepting inputs (some internally generated, some externally), generating outputs (again, both internal and external) and processing received data to perform specific actions. "Layers" is a way of organizing the code, to categorize functionality to increase efficiency and economy of operation. These layers can be organized into a state transition diagram which shows expected results for specific inputs. There concepts are well known by those skilled in the art of software design. In the prior art access terminal, there is a GMM layer 401 and an RR layer 403. FIG. 4, discussed in detail below, illustrates the relationship between the prior art GMM layer 401 and the prior art RR layer 403.

Referring again to FIG. 3, a de-registered access terminal 20 will stay in a GMM-Deregistered state 302 in which access terminal 20 will not perform any routing area updates and the network will never page access terminal 20. A registered access terminal 20 will stay in GMM-Registered state 304, whereby it can initiate call/session setup, routing area update and be paged by the network. Transition between the two states are caused by events shown in FIG. 3. Implicit in all prior art systems is that spot beams always exist, and are always illuminated.

Upon power-on, GMM Layer 401 transitions from state 306 to GMM Deregistered (GMM Dereg.) PLMN Search State 308. Generally, in discussing FIG. 3, transitions from one state to another will be referred to as a "path". Transitions from a state are described with the following nomenclature: Paths are given designations representing the state of origin. For example, a first path, "path A" originating from state 310, will be referred to as "path 310A".

When GMM Layer 401 is in GMM Dereg. PLMN Search State 308, access terminal 20 is searching for PLMNs; generally, any BCCHs, but most probably an A-BCCH 9. At this point, access terminal 20 is not registered with any gateway, and that is why, as discussed above, GMM Layer 401 is described as being "de-registered". In a "deregistered" state, access terminal 20 has GPRS capability enabled, but no GMM context has been established. In this state of being "deregistered" access terminal 20 may establish a GMM context by starting the GPRS attach procedure.

Eventually, a PLMN is identified, and GMM Layer 401 transitions to either GMM Dereg. Normal Service State 310, or GMM Dereg. Limited Service State 308, via paths 308A or 308D respectively. Otherwise, GMM Dereg. PLMN Search State 308 is left when it has been concluded that no cell is available at the moment, and GMM Layer 401 transitions to GMM Dereg. No Cell Available State 336, via path 308C.

GMM Dereg. Normal Service State 310 is defined as the state to wait for operator initiated registration request. In GMR-1, registration is automatic and therefore this state has no waiting period. GMM Layer 401 transitions from GMM Dereg. Normal Service State 310, through path 310A, to GMM Dereg. Attach Needed State 312.

In GMM Dereg. Attach Needed State 312, valid subscriber data is available and for some reason a GPRS attach must be performed as soon as possible. GMM Dereg. Attach Needed State 312 is usually of no duration, but can last if the access class is blocked. An access class represents a "quality of service" indicator. That it, different access classes are established (perhaps as many as 15 or more) and users may be assigned to any one of them. The user's quality of service may depend on the access class to which it belongs.

While GMM Layer 401 is in GMM Dereg. Attach Needed State 312, GMM Layer 401 sends a message to RR Layer 303 to perform an "Attach Request" procedure, and GMM Layer 401 transitions through path 312A to GMM Registered (GMM Reg.) Initiated State 316. GMM Reg. Initiated State 316 is an "in-between" state—neither de-registered as in state 403, nor registered as in state 304.

In GMM Reg. Initiated State 316, a GPRS attach procedure has been started and access terminal 20 is waiting a response from the network. There can be several outcomes to this request. First, if the attempt to attach is rejected, GMM Layer 401 transitions to GMM Dereg. Attempting to Attach State 314 via path 316A. GMM Dereg. Attempting to Attach State 314 represents the condition in which no GMM Layer 401 procedure will be initiated except a GPRS Attach. The execution of further attach procedures depends on the GPRS attach procedure counter. However, while GMM Layer 401 is in GMM Dereg. Attempting to Attach State 314, there are several other possible transitions that might also occur.

GMM "registered" defines a set of states in which a GMM context has been established, i.e. the GPRS attach procedure has been successfully performed. In these states, access terminal 20 may activate PDP contexts, send and receive user data and signaling information, and may reply to a page request. Furthermore, cell and routing area updating are performed.

GMM Registered Normal Service State 318 is the state in which user data and signaling information may be sent and received. In GMM Registered Update Needed State 320, access terminal 20 has to perform a routing area updating procedure, but its access class is not allowed in the cell. The procedure will be initiated as soon as access is granted (this might be due to a cell-reselection or due to change of the barred access class of the current cell). No GMM procedure except routing area updating shall be initiated by access terminal 20 in GMM Registered Update Needed State 320. Additionally, while in GMM Registered Update Needed State 320, no user data and no signaling information shall be sent.

After transitioning to GMM Reg. Update Needed State 320, GMM Layer 401 causes a Routing Area Update (RAU) request to be issued, and this places GMM Layer 401 in GMM Routing Area Update Initiated State 322. Note that similarly to GMM Registered Initiated State 316, GMM Routing Area Update Initiated State 322 is neither registered 304 nor deregistered 403, but, "in-between." GMM Routing Area Update Initiated State 322 is the state in which a routing area update procedure has been stated and access terminal 20 is awaiting a response from the network.

Following the request, access terminal 20 is involved in communications with NGW 12, and enters GMM Reg. Attempting to Update State 324, via path 322A. GMM Reg. Attempting to Update State 324 may be described as the condition in which a routing area updating procedure has failed due to a missing response from the network. Similar to attach procedure, access terminal 20 retries the procedure controlled by timers and a GMPRS attempt counter. No GMM procedure except routing area updating shall be initiated by access terminal 20 while in this state. No data shall be sent or received.

GMM layer 401 may leave GMM routing area update initiate state 322 via path 322B, if the RAU is accepted or if the RAU counter is less than five (5), a failure case occurs and the current RAI equals the stored RAI. If those conditions are true, GMM Layer 401 proceeds, via path 322B, to GMM Reg. Normal Service State 318.

GMM Layer 401 may leave GMM Reg. Normal Service state 310 for several reasons. First, if n/w initiates a detach received with reattach, GMM Layer 401 transitions to GMM Dereg. Attempting To Attach State 314 via path 318B. Second, if n/w initiates a detach received without reattach implicit detach, GMM Layer 401 will transition to GMM Dereg. Normal Service State 310 via path 318C. And lastly, if access terminal originates a detach request, GMM layer 401 will transition to GMM Dereg. Initiated State 326, via path 318D. Once at GMM Dereg. Initiated State 326, GMM layer 401 will transition to GMM Dereg. Normal/Service State 310 via path 326B if the detach request is accepted.

FIG. 4 illustrates a signal flow diagram of the interaction between a prior art GPRS mobility management software layer and a radio resource software layer during power up of, and PLMN selection by, an access terminal. The method of FIG. 4 begins with step 401. In step 401, GMM layer 401 is powered up and enters a GMM Deregistered PLMN Search state. While in the GMM Deregistered PLMN Search state, GMM layer 401 acquires all information from a subscriber information module, and then, in step 402 directs the RR layer 403 to search for available PLMNs.

RR layer 403 then acquires a list of available PLMNs. To do this, RR layer 403 first performs a cell selection process in step 403, wherein all cells with adequate power are identified, and the BCCHs associated with these cells are called suitable BCCHs. In step 404 access terminal 20 then camps on one of the BCCHs. In step 405 RR layer 403 reads all suitable BCCHs, and generates an available BCCH list and a list of available PLMNs. In step 406, RR layer 403 provides the available PLMN and RAI/LAI list to GMM layer 401, and waits for further GMM layer 401 instruction.

In step 407, GMM layer 401, while still in the GMM Deregistered PLMN Search state, prioritizes the received PLMN/RAI list and selects the first PLMN/RAI on the list (that is part of a cooperative network), and then, in step 408, informs RR layer 403 to select the BCCH associated with the selected PLMN and RAI.

In step 409, RR layer 403 switches and camps-on the BCCH ARFCN according to the received GMM layer 401 instruction. The camp-on result can be either be successful or a failure, and in either event, a status message will be sent to GMM layer 401 in step 410. In steps 411 and 412 respectively, GMM layer 401 decides to register to the selected PLMN by transitioning from GMM Deregistered PLMN Search state to GMM Deregistered Normal service state, then to GMM Deregistered Attached Needed state.

In step 413A, GMM layer 401, while in the GMM Deregistered Attach Needed state, transmits a GMM packet data unit (PDU) to logical link (LL) layer 402. The GMM PDU contains an "Attach Request" GMM message. The GMM PDU is converted to an LLC PDU and delivered to RR layer 403 (in step 1013B), asking RR layer 403 to pass this GMM PDU to the network GMM layer. Network GMM layer is the GPRS Mobility Management layer on the network side; it manages user (access terminal 20) registration status, remembers user location and routes incoming data requests to a particular spot beam based on the access terminal's 20 currently registered location. GMM layer 401, in step 414 moves to a GMM Registered Initiated state and Timer T3310 is started.

In step 415 RR layer 403 stores the LLC PDU and tries to setup a connection with the network before sending the LLC PDU to the network. If the access terminal 20 Access Class is not blocked, RR layer 403 sends a channel request message, with an establishment cause, "Attach Request" (step 416). In the event a connection has been setup, RR layer 403 passes the LLC PDU containing the GMM PDU to the network (part of step 416).

In step 417, an "Attach Accept" is received by RR layer 403 from EGW 12, and passed to GMM layer 401 in step 418. GMM layer 401 then stops timer T3310 (Step 419), moves from a GMM Deregistered state to a GMM Registered state (Step 420), and informs RR layer 403 of the successful registration (step 421). In step 422, RR layer 403 leaves the packet transfer mode and starts periodic cell reselection in idle mode.

FIG. 5 illustrates a signal flow diagram of the interaction between a prior art GPRS mobility management software layer and a radio resource software layer during packet service request by a registered access terminal. The method of FIG. 5 begins with step 501. In step 501, GMM layer 401 is in GMM Registered Normal Service state. While GMM layer 401 is in the GMM Registered Normal Service state, RR layer 403 is camped on an A-BCCH 9 transmitting from EGW 8 (step 502).

In step 503, application layer 504 of access terminal 20 directs session management (SM) layer 505 of access terminal 20 to establish a session for an uplink data transfer. In step 504, SM layer 505 exchanges primitives with GMM layer 401 to confirm access terminal 20 is GPRS attached. In this case, positive confirmation is received. In step 505, SM layer 505 creates an SM Packet Data Unit (SM PDU) and passes the SM PDU to GMM layer 401, asking GMM layer 401 to transfer this message to the EGW 8 SM layer.

In step 506A, GMM layer 401 stores the SM PDU, and passes this message to LL layer 402, in which GMM PDU is converted to LLC PDU, then delivers the LLC PDU to RR layer 403 in step 506B. LL layer 402 requests RR layer 403 to pass the LLC PDU message to the EGW 8 GMM layer. RR layer 403 first stores the LLC PDU in step 507, and tries to setup a connection before sending the LLC PDU to EGW 8. RR layer 403 sets up the connection by initiating a RACH process (step 508), with establishment cause "Packet Service Request". After a connection is established, RR layer 403 passes the stored GMM PDU to EGW 8, in step 509. In step 510, after the connection is released, RR layer 403 returns to idle mode, and GMM layer 401 stays in the GMM Registered Normal Service state (step 511).

SUMMARY OF THE INVENTION

The above described disadvantages are overcome and a number of advantages are realized by the present invention which relates to a system and method to facilitate providing a new service by a new service provider to an existing user access terminal of an existing service provider.

The system and method of the invention can be described more particularly as the implementation of software layers within an access terminal, in which that implementation assigns specific functions and operations to specific layers that facilitate the efficient operation of the access terminal by controlling internal and external communications and operations.

An embodiment of the invention is described by a method for distribution of information and data between a radio resource and a mobility management software layer of an access terminal in a satellite telecommunications system, comprising the steps of receiving one or more broadcast channel transmissions containing system information from an existing service provider, each broadcast channel corresponding to a different spot beam, measuring parameters for each of the one or more broadcast channels by the radio resource layer, passing system information contained in the one or more broadcast channels that exceeds threshold parameters for adequate reception from the radio resource layer to the mobility management layer, receiving instructions to camp on a specific spot beam from the mobility management layer, and camping on the specific spot beam by the radio resource layer.

Another embodiment of the invention is described by an access terminal for use in a satellite based communications system, comprising a transceiver adapted to communicate with a satellite, a microprocessor assembly, adapted to control the transceiver to enable communications between a user of the access terminal, and either a new or existing gateway, the microprocessor including software to control the access terminal and enable the communications between the user and the new gateway when the communication path between the access terminal and the new gateway is a temporary broadcast control channel, and the software comprising a radio resource software layer adapted to perform a first group of functions and a mobility management software layer adapted to perform a second group of functions.

A further embodiment of the invention is described by a method performed by a radio resource layer in an access terminal for transitioning from a dark beam to an illuminated beam, comprising, verifying that a concurrent BCCH Info. List system information element in a system message has been updated with a new HPLMN ID, retrieving a frequency identifier from the concurrent BCCH Info. List system information element in the system message transmitted on an anchored broadcast channel, which identifies a temporary broadcast channel, camping on the frequency indicated by the retrieved frequency identifier, and monitoring the temporary broadcast channel for availability, received power levels and other criteria.

An additional embodiment of the invention is described by a method performed by a radio resource layer in an access terminal for transitioning from an illuminated beam to a dark beam, comprising, retrieving a frequency identifier from the concurrent BCCH Info. List system information element in the system message transmitted on a temporary broadcast channel, which identifies an anchored broadcast channel, detecting that temporary broadcast channel has stopped transmitting, camping on to an anchored broadcast channel, identified by the frequency identifier, and verifying that the concurrent BCCH Info List system information element in the system message transmitted on the anchored broadcast channel verifies that the temporary broadcast channel has stopped transmitting.

A further embodiment of the invention describes a method for establishing communications between an access terminal and a new service provider, through the distribution of information and data between a radio resource and mobility management software layer of an access terminal in a satellite communications system, comprising the steps of camping on a broadcast channel from an existing service provider, transmitting an attach request from the mobility management layer to the radio resource layer, performing a dark beam activation procedure by the radio resource layer, providing system information about a temporary broadcast channel from a new service provider, from the radio resource layer to the mobility management layer, performing an attach procedure to the new service provider by the mobility management layer and entering into a normal service state by the mobility management layer.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, in which:

DETAILED DESCRIPTION OF THE PREFERRED EMBODIMENT

Figure 1:
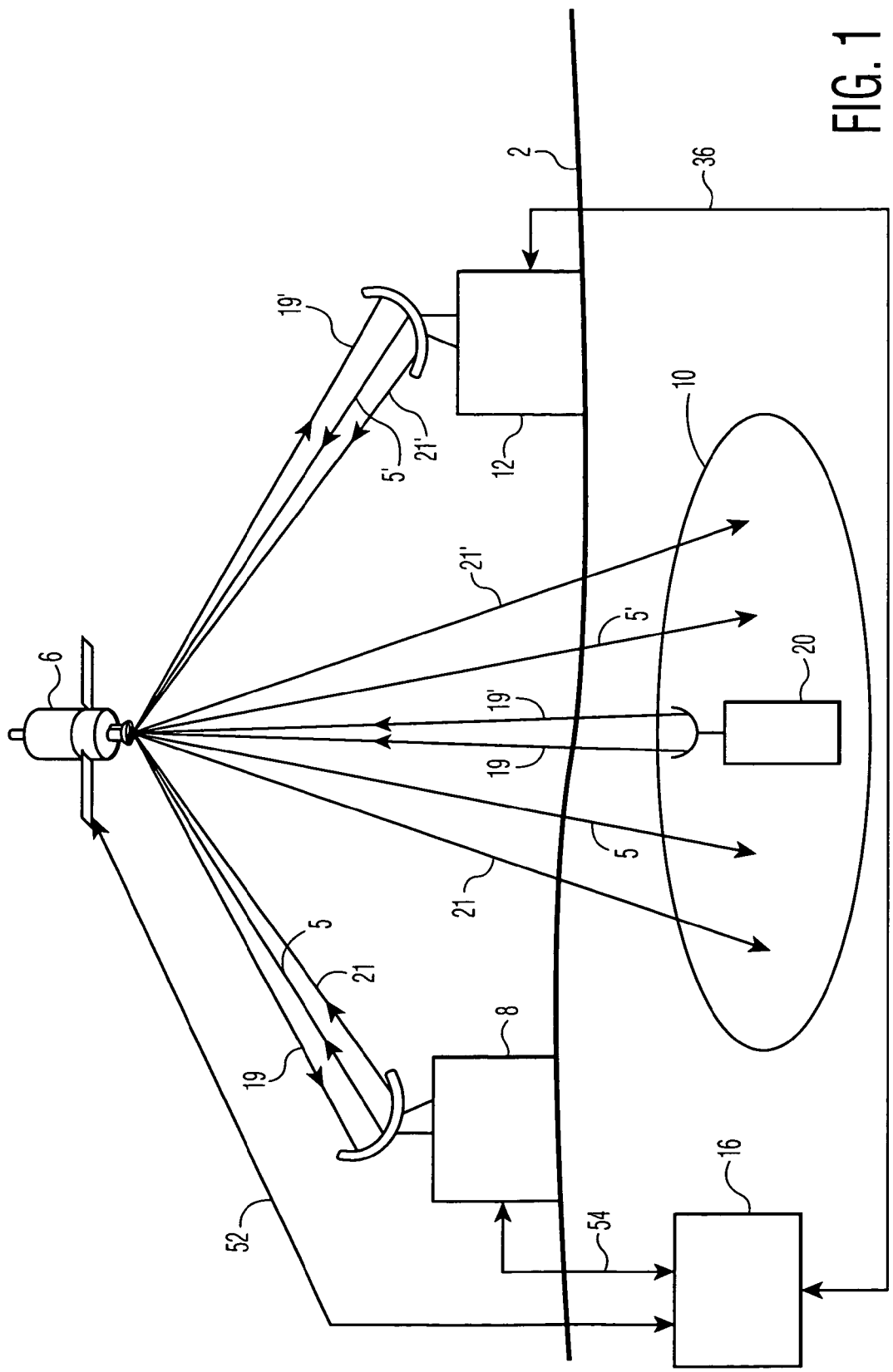
FIG. 1 illustrates a block diagram of a satellite communication system according to the prior art.
Figure 2:
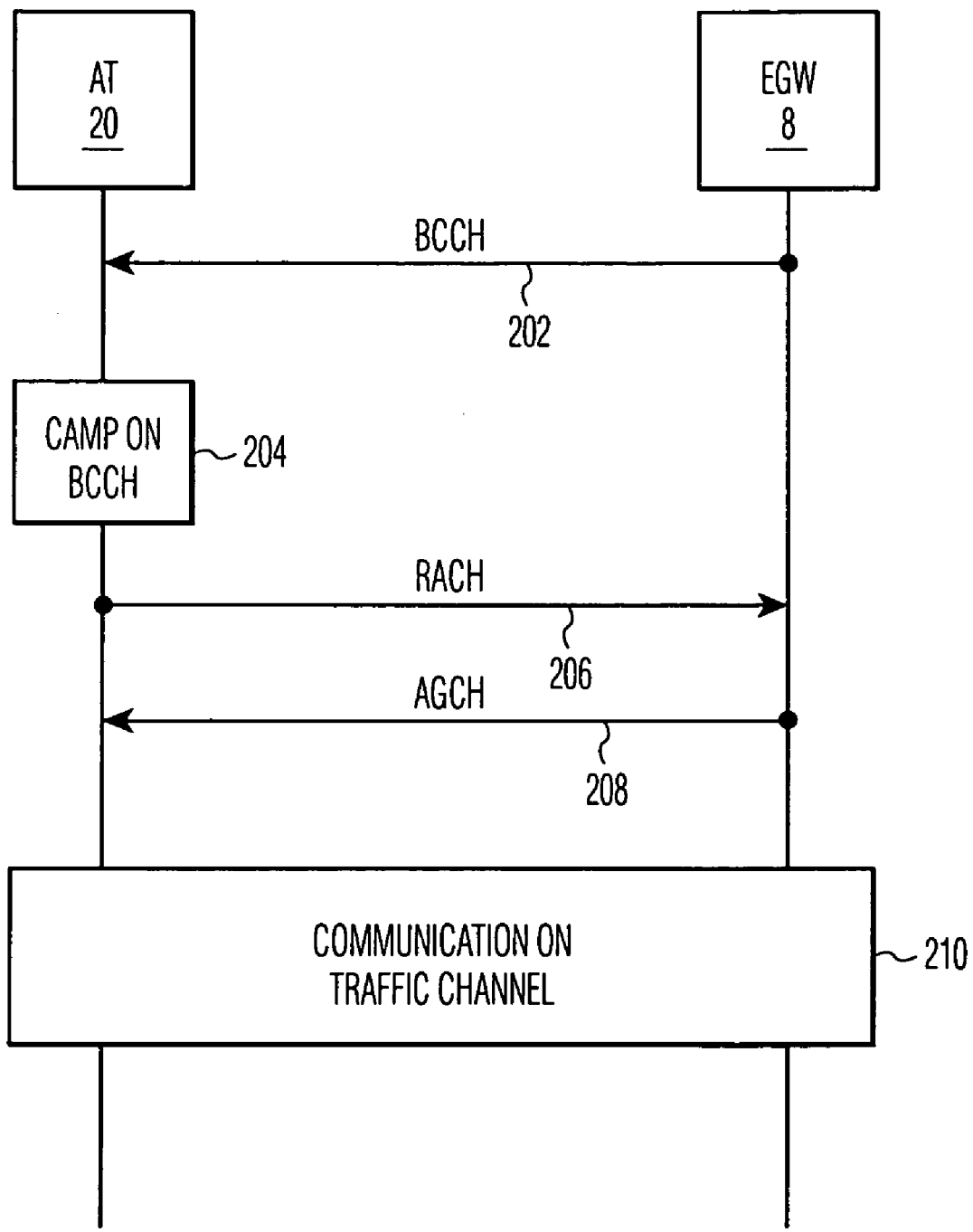
FIG. 2 illustrates a message flow diagram showing the establishment of a communications channel between an access terminal and the network according to the prior art.
Figure 3:
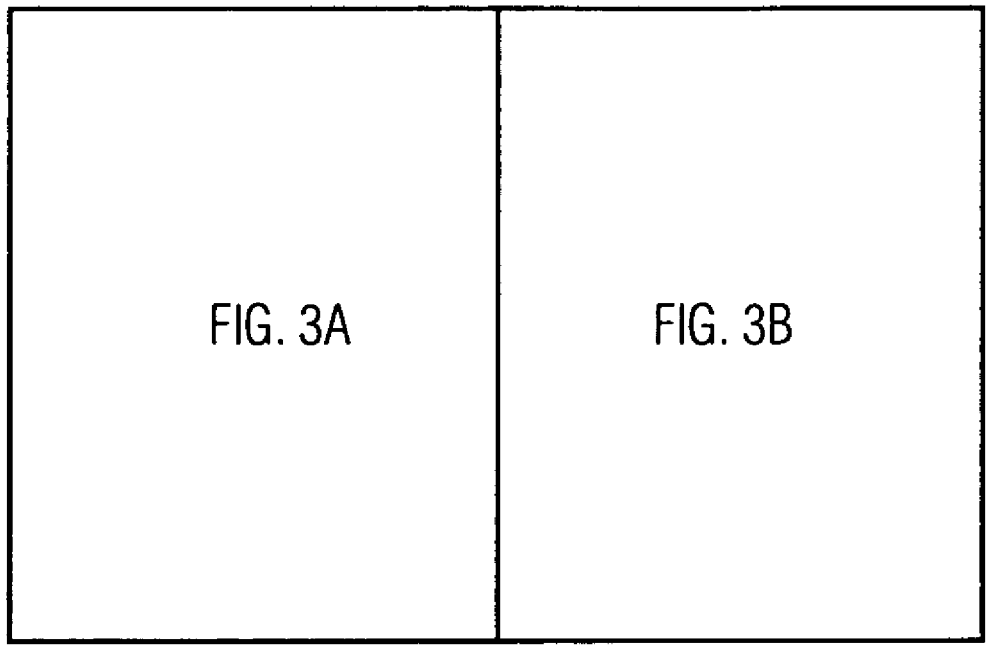
FIG. 3 illustrates a state transition diagram for a GSM/GPRS mobility management software layer according to the prior art.
Figure 3A:
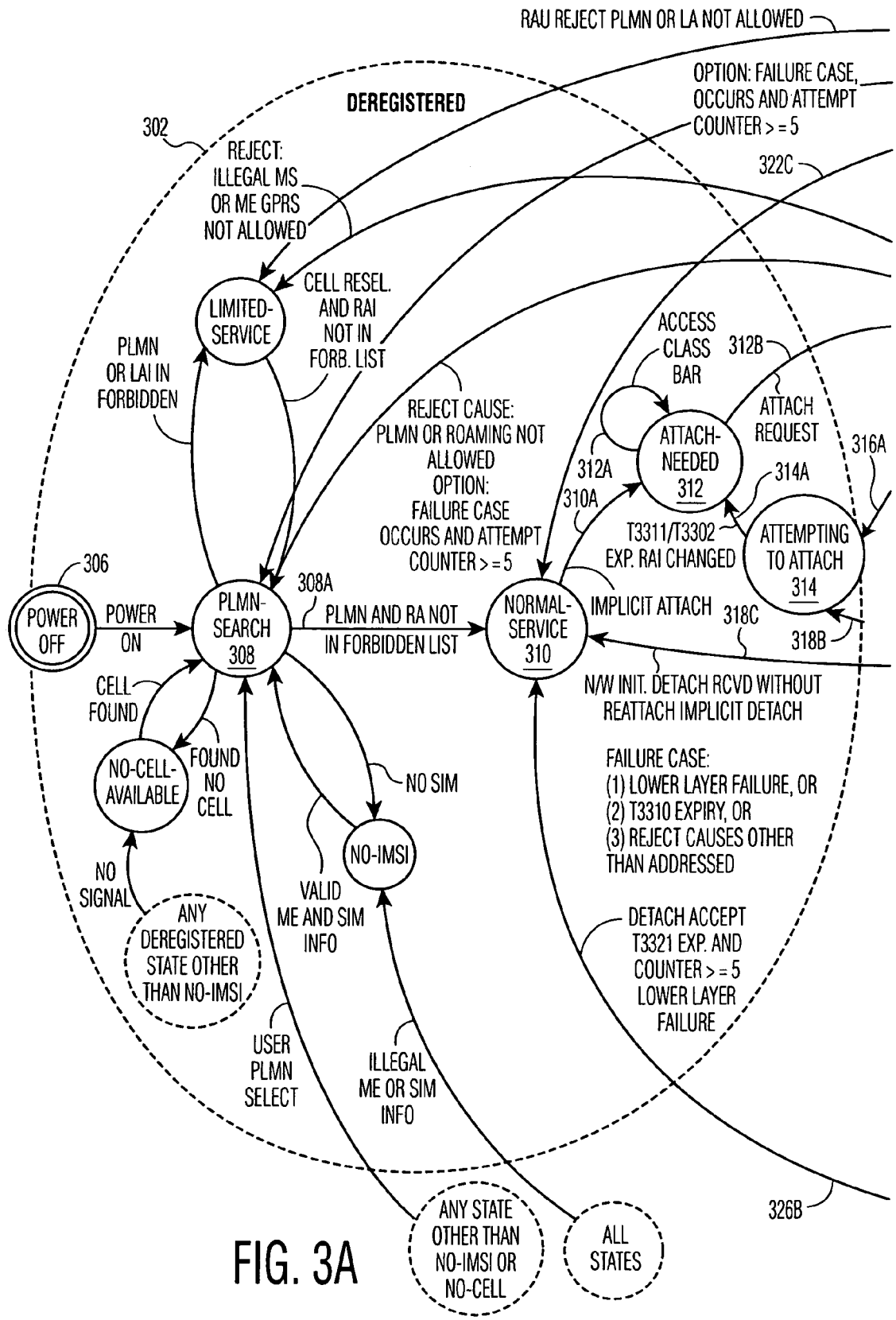
Figure 3B:
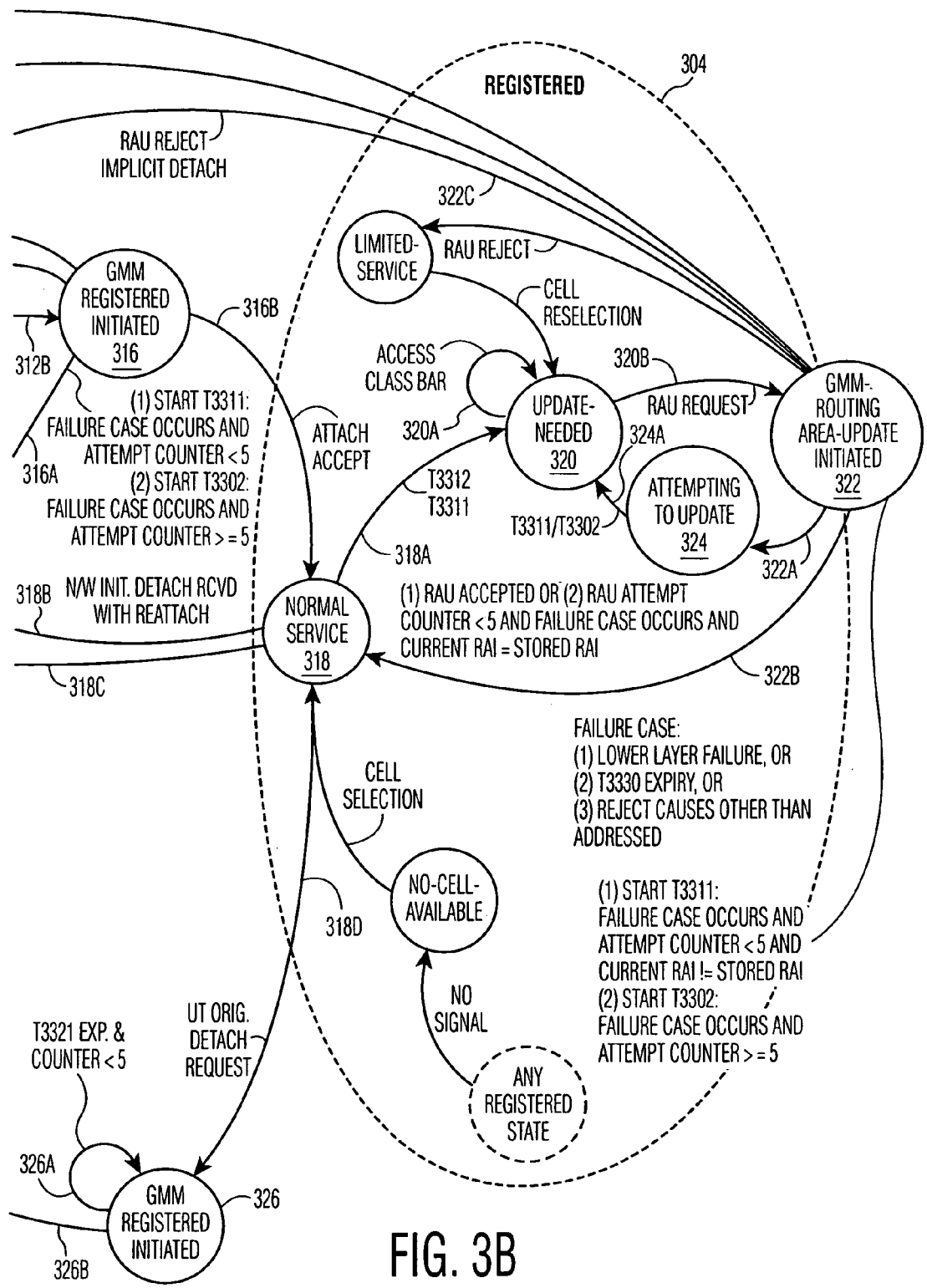
Figure 4:
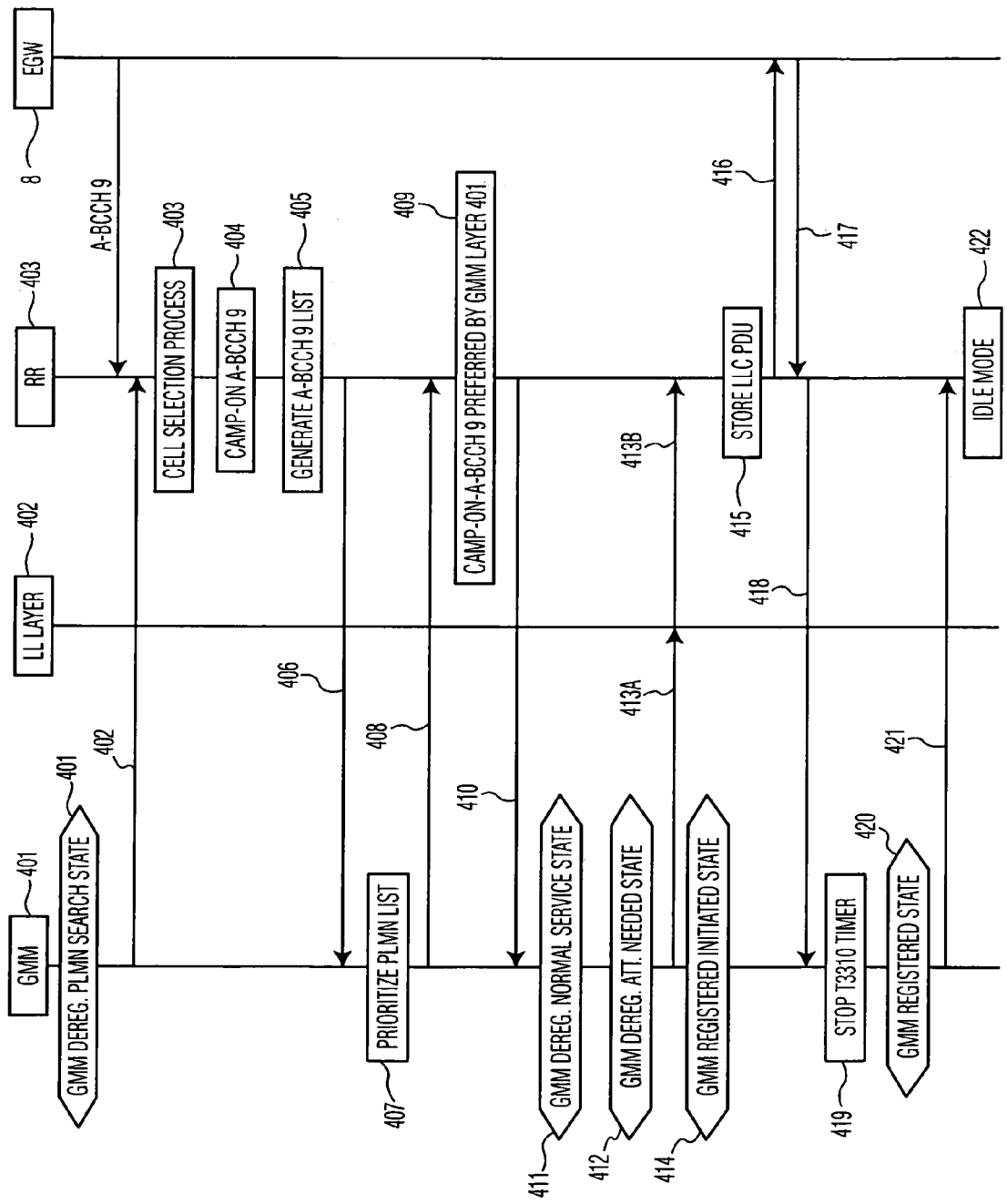
FIG. 4 illustrates a signal flow diagram of the interaction between a prior art GPRS mobility management software layer and a radio resource software layer during power up of, and PLMN selection by, an access terminal.
Figure 5:
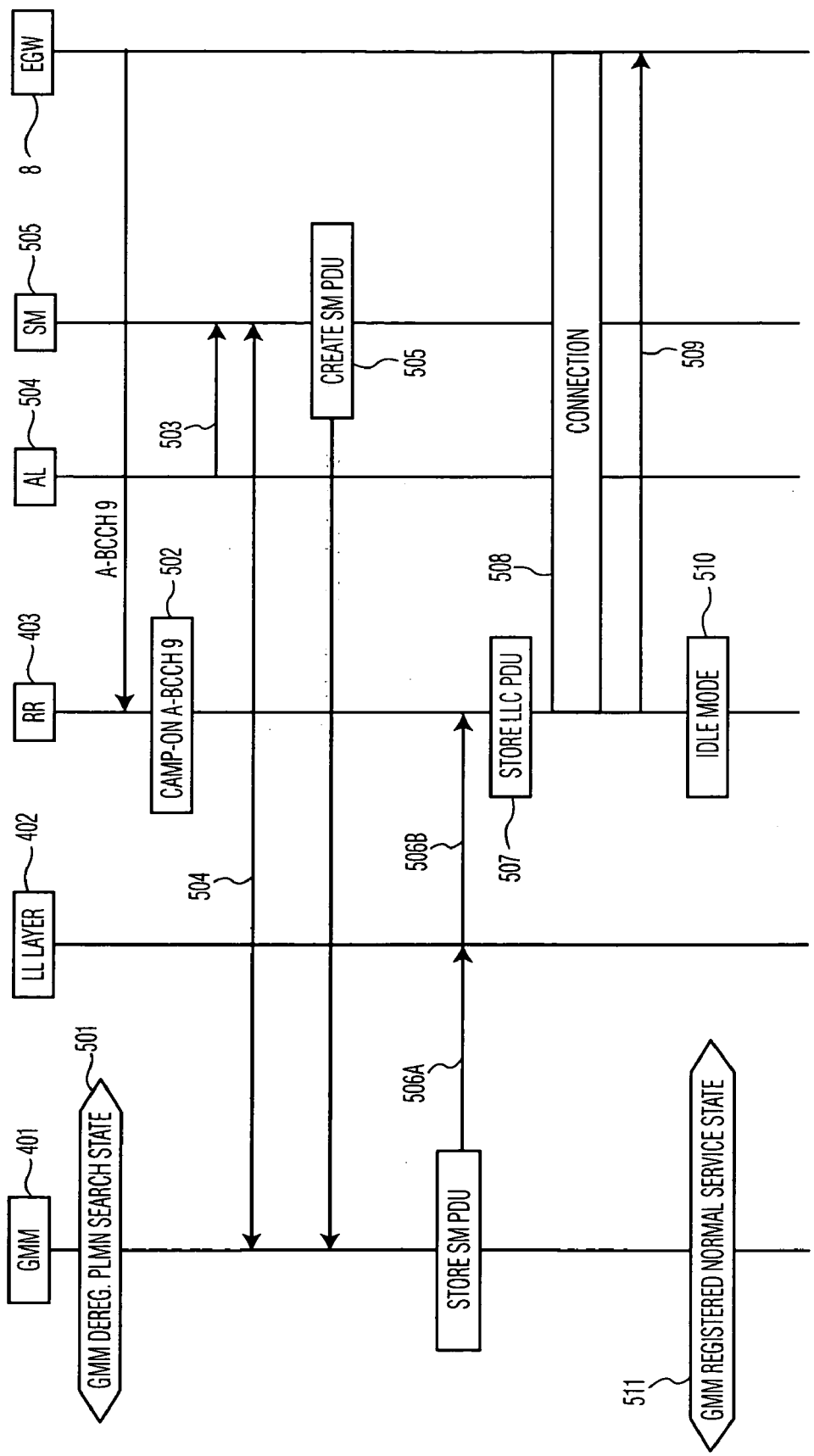
FIG. 5 illustrates a signal flow diagram of the interaction between a prior art GPRS mobility management software layer and a radio resource software layer during packet service request by a registered access terminal.

The various features of the invention will now be described with reference to the figures, in which like parts are identified with the same reference characters.

The following detailed description of the preferred embodiment is related to two co-pending applications: "DARK BEAM OPERATION SCENARIO," A. Noerpel, et al., Ser. No. 10/83,838; and "A MOBILITY MANAGEMENT STATE TRANSITION SYSTEM AND METHOD FOR HANDLING DARK BEAM SCENARIOS," A. Noerpel, et al., Ser. No. 10/85,277, the entire contents of both being expressly incorporated herein by reference.

Figure 6:
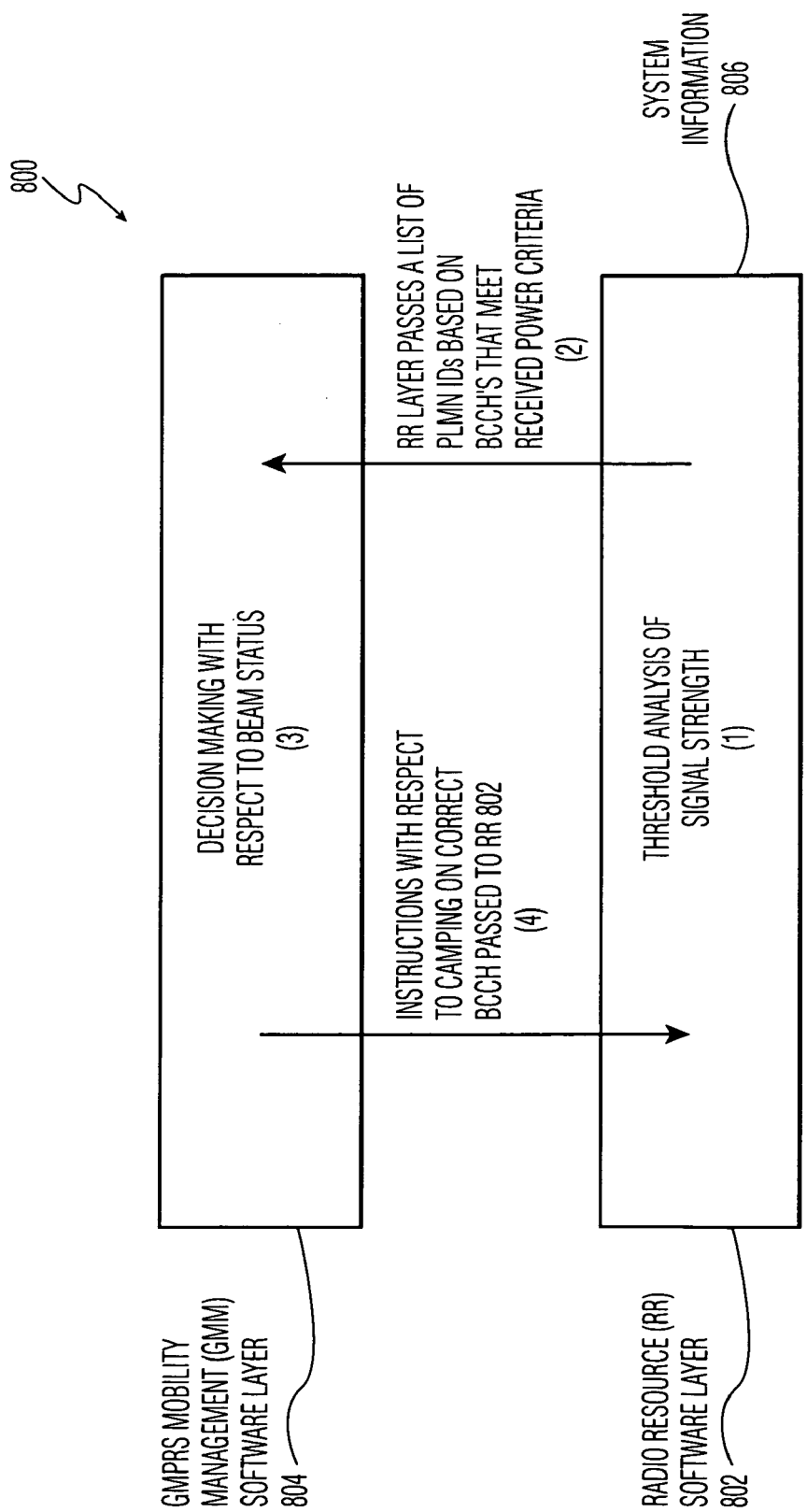
FIG. 6 illustrates a simplified signal flow diagram showing the interaction between GMPRS mobility management software layer and radio resource software layer of an access terminal in accordance with an embodiment of the invention.
Figure 8:
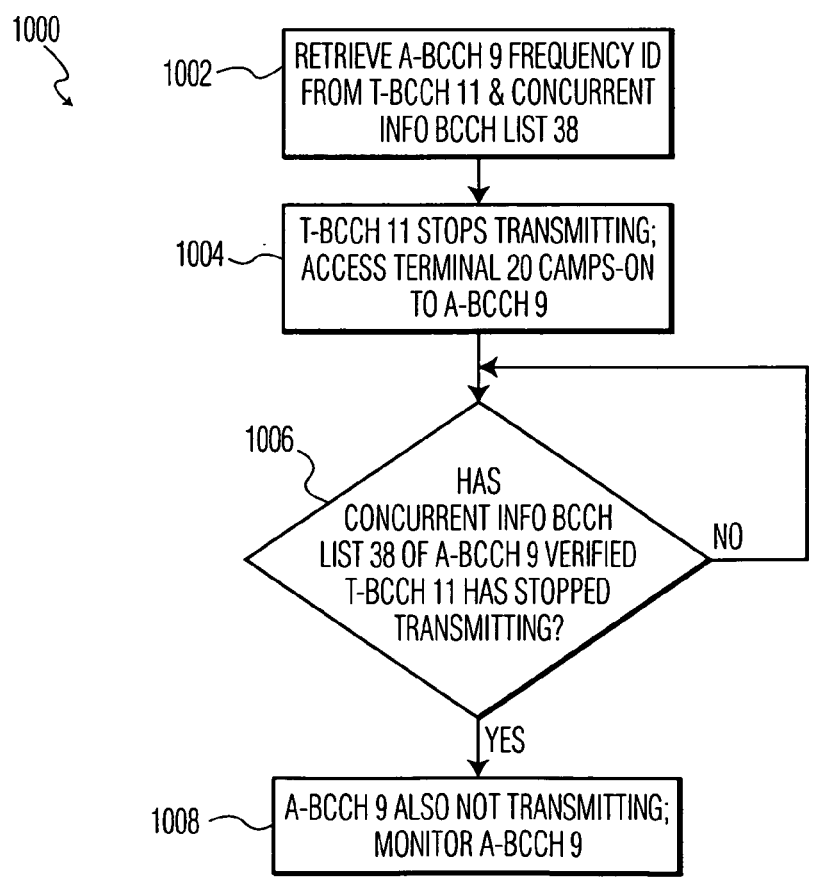
FIG. 8 illustrates a signal flow diagram of the radio resource software layer of an access terminal when transitioning from an illuminated beam to a darkened beam according to an embodiment of the invention.

FIG. 6 illustrates a signal flow diagram showing the interaction between GMPRS mobility management software layer and radio resource software layer of an access terminal in accordance with an embodiment of the invention. FIG. 8 shows generally how the two software layers, radio resource software layer (RR layer) 802 and GMPRS mobility management layer (GMM layer) 804 have been designed into access terminal 20. Generally, RR layer 802 receives or monitors all available channels, measuring signal strength on any channels showing activity (i.e., check the presence of a signal and decode of the BCCH system information). Thus, RR layer 802 performs threshold analysis for all BCCH signals that are present (shown as step (1)). When a received signal's parameters exceed established power criteria, RR layer 802 passes the included system information to GMM layer 804 (shown as step (2)), in the form of a list of PLMN IDs. GMM layer 804 then makes decisions regarding beam illumination status (shown as step (3)), and provides instructions to RR layer 802 (shown as step (4)) to camp on the correct BCCH (T-BCCH 11 (dark beam scenario) or A-BCCH 9).

Access terminal 20 provides users with several features that are transparent to the user; that is, these are features that are a direct result of the design of RR layer 802 and GMM layer 804. These features will be briefly discussed, then the design of the two layers will be discussed in greater detail.

RR layer 802 and GMM layer 804 provide users with the following features:

1. Prioritization of Accessible Spot Beams (RR Function).

A dark beam may have no accessibility for packet users due to various reasons. This is indicated by the combination of Cell Bar Access Flag SIE 40 and Cell Bar Extension Flag SIE 42 transmitted in the corresponding A-BCCH 9. Access terminal 20 should not camp on a non-accessible A-BCCH 9 unless there is no accessible A-BCCH 9 available. Therefore, access terminal 20 must check Cell Bar Access Flag SIE 40 before doing anything else.

2. Routing Area Update (RAU) Procedure (GMM Function).

A routing area update (RAU) procedure is used to periodically inform the network that access terminal 20 is still "alive", i.e., still functioning in the area, and desirous of communicating in the network. If access terminal 20 does not inform the network it is interested, the network will never page access terminal 20 when downlink data becomes available. Additionally, whenever access terminal 20 changes from one routing area to another, due to user mobility, a RAU procedure is used to inform the network about it its new location so that the network knows where to page access terminal 20 the next time data is available for it. When access terminal 20 is in a dark beam, it should not perform a RAU procedure at the expiry of RAU timer or a change of routing area.

3. Registration Issue (GMM Function).

In a dark beam, access terminal 20, after power on, should automatically initiate an attach procedure as a preliminary step in attempting to illuminate the dark beam. An attach procedure is a preliminary step that registers an access terminal 20 with a network. As a result, the user does not have to manually register himself before initiating a service request (i.e., the method described in related application, Ser. No. 10/83,838, entitled "DARK BEAM OPERATION SCENARIO").

4. Change of Beam Illumination Status (Combination of RR and GMM Function)

If a dark beam becomes illuminated, all de-registered access terminals 20 shall initiate an Attach Procedure to EGW 8 to register themselves. All registered access terminals 20 whose RAU timers have been expired or whose routing area identity (RAI) has been changed shall perform a RAU Procedure to update their status on the network. An RAI is utilized for paging purposes. Paging occurs when EGW 8 wishes to communicate with access terminal 20, so it verifies the location of access terminal 20 with a paging process. The RAI is an identifier created and used by access terminal 20 to inform EGW 8 of its location. This is done whenever access terminal 20 enters a new spot beam (as discussed above) or when its RAU timer expires.

If an illuminated beam becomes dark, access terminal 20 shall camp on an A-BCCH 9 of EGW 8. The change of selected network shall not trigger access terminal 20 to initiate an attach procedure or RAU procedure to the new network.

Figure 7:
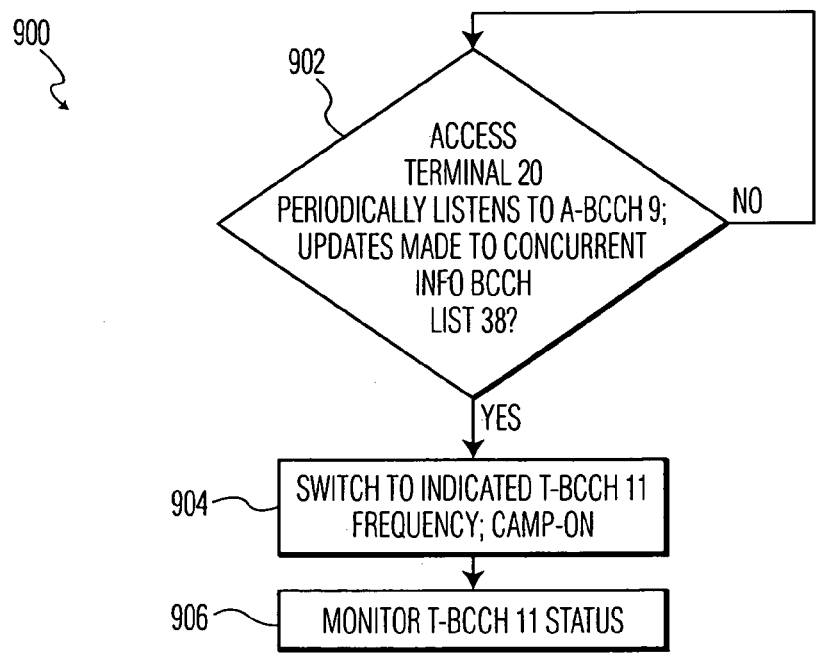
FIG. 7 illustrates a signal flow diagram of the radio resource software layer of an access terminal when transitioning from a darkened beam to an illuminated beam of in accordance with an embodiment of the invention.

FIG. 7 illustrates a signal flow diagram of the radio resource software layer when transitioning from a darkened beam to an illuminated beam of an access terminal in accordance with an embodiment of the invention. To support dark beam operation, RR layer 802 in access terminal 20 has been designed to camp on a correct A-BCCH 9 when the beam illumination status has been changed. Access terminal 20 will also be able to handle both temporary signal blockage and beam darkening when camped on T-BCCH 11. RR layer 802 has been designed to perform specific actions on the occasion of a beam changing from a darkened to an illuminated state, and also when changing from an illuminated to a darkened state. Related application Ser. No. 10/83,838, "DARK BEAM OPERATION SCENARIO", illustrates the steps when changing from a dark beam to an illuminated beam (and also when darkening an illuminated beam). Note that FIGS. 7 and 8 depict operations of RR layer 802 when illuminating a dark beam and when darkening an illuminated beam, respectively.

In step 902, access terminal 20 is in a dark beam, and periodically listens to A-BCCH 9 to detect any update of Concurrent BCCH Info List SIE 38 that is contained in System Information Message 56: existence of Home PLMN (HPLMN) in Concurrent BCCH Info List SIE 38 indicates that the beam has been illuminated. If no change is detected (no path decision from step 902), access terminal 20 keeps listening. If Concurrent BCCH Info List SIE 38 is updated (yes path decision from step 902) access terminal 20 shall retrieve the ARFCN SIV 41 for T-BCCH 11, and in step 904, switch to T-BCCH 11 using the indicated frequency. In step 906, access terminal 20 monitors T-BCCH 11 transmission and periodically confirms its availability. In essence, FIG. 7 represents some of the activities of access terminal 20 in the related application, Ser. No. 10/83,838, "DARK BEAM OPERATION SCENARIO."

FIG. 8 illustrates a signal flow diagram of the radio resource software layer of an access terminal when transitioning from an illuminated beam to a darkened beam according to an embodiment of the invention. FIG. 8 illustrates the steps when changing from an illuminated beam to a dark beam. In step 1002, access terminal 20 is in an illuminated beam, and decodes the frequency identified within ARFCN SIV 41 of the associated A-BCCH 9 frequency from the Concurrent BCCH Info List 38 transmitted in System Information Message 56 via T-BCCH 11, and stores this information. In step 1004, access terminal 20 has detected signal loss from T-BCCH 11 (i.e., satellite 6 has stopped transmission), and switches to a concurrent A-BCCH 9, using the A-BCCH 9 frequency stored in its memory from step 1002.

In step 1006, access terminal 20 checks A-BCCH 9 and verifies that Concurrent BCCH Info List SIE 38 in System Information Message 56 confirms that T-BCCH 11 has stopped transmitting. If Concurrent BCCH Info List SIE 38 confirms that T-BCCH 11 has indeed stopped transmitting from satellite 6, then access terminal 20 will then declare that the beam has darkened, and will remain on the current A-BCCH 9 (yes path decision in step 1006). If T-BCCH 11 has not stopped transmitting then RR layer 802 continues to monitor Concurrent BCCH Info List SIE 38 (no path decision in step 1006). In step 1008 A-BCCH 9 has also stopped transmitting and then access terminal 20 shall begin to periodically monitor A-BCCH 9 availability.

Figure 9:
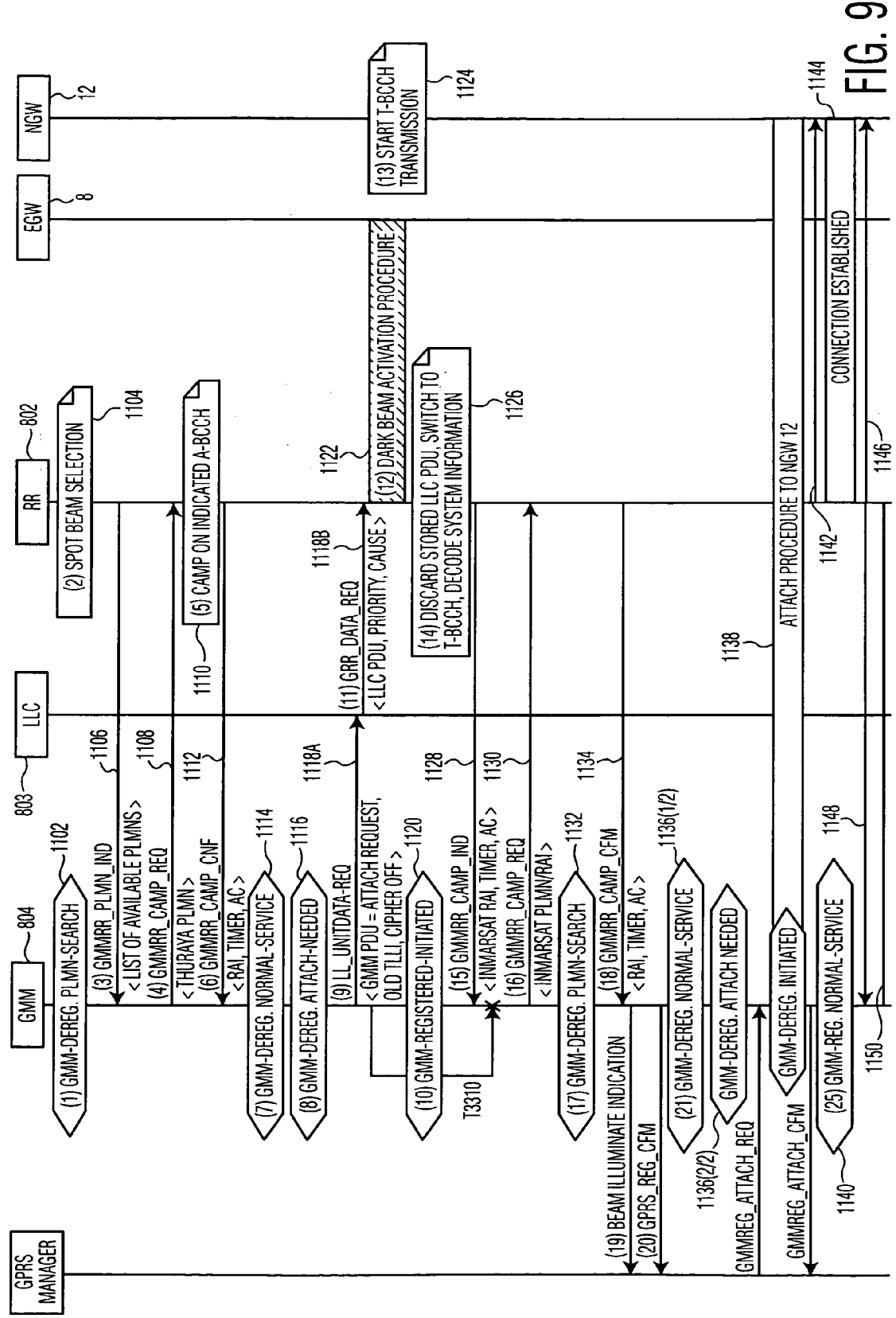
FIG. 9 illustrates a detailed signal flow diagram of the interaction between a GMPRS mobility management software layer and a radio resource software layer of an access terminal during the successful illumination of a dark beam in accordance with an embodiment of the invention.

FIG. 9 illustrates a detailed signal flow diagram of the interaction between a GMPRS mobility management software layer and a radio resource software layer of an access terminal in accordance with an embodiment of the invention. The flow diagram of FIG. 9 represents the different states of both the GMM and RR layers of access terminal 20 during a successful illumination of a dark beam. Many of the states of GMM layer correspond to the states referenced in a related application, Ser. No. 10/85,277, entitled "A MOBILITY MANAGEMENT STATE TRANSITION SYSTEM AND METHOD FOR HANDLING DARK BEAM SCENARIOS." In FIG. 9, the various "states" and transmission are referred to as "steps."

GMPRS Mobility Management-Radio Resource (GMM-RR) Interface Method 1100 begins with step 1102. In step 1102, GMM Layer 804 is in the GMM-Dereg. PLMN Search state. In this state, GMM Layer 804 is in a "de-registered" state in reference to EGW 8. That is, EGW 8 does not know of access terminal's 20 (GMM Layer 804) existence, and GMM Layer 804 does not yet know of EGW's 8 existence. While in GMM-Dereg-PLMN-Search state, step 1102, GMM layer 804 will acquire the access terminal's 20 user ID and Home PLMN ID from a subscriber identity module (SIM). The SIM is an electronic card, similar to a credit card, which contains subscriber information necessary to use access terminal 20.

Thereafter, RR Layer 802 begins its attempt to acquire a spot beam (Step 1104). RR Layer 802, as discussed above, constantly measures all available frequencies it is capable of measuring, until it finds one that it can read reliably and obtain system information from. As system information is acquired by RR Layer 802, it is passed to GMM Layer 804 in the form of a list in step 1106. This may be one channel, or many; RR Layer is non-discriminatory it passes information about any channel that passes certain threshold criteria.

The list of suitable A-BCCHs 9 that RR layer 802 passes to GMM layer 804 lists the PLMNs, routing area identifies (RAI) and location area identifies (LAI) of the A-BCCH's 9 it has found suitable. This is referred to as the PLMN/RAI/LAI list. Between steps 1106 and 1108, GMM Layer 804 decides on which particular spot beam—i.e., channel, access terminal 20 should attempt to communicate with. The channel GMM layer 802 chooses from the PLMN/RAI/LAI list is the channel highest on the PLMN/RAI/LAI list which is part of a cooperative network. A cooperative network is one in which access terminal 20 (and hence its user) has a service agreement with. Thus, in step 1108, GMM Layer 804 passes GMMRR_CAMP_REQ message to RR Layer 802, which lists the PLMN ID of the spot beam it desires to have access terminal 20 camp on.

After the GMMRR_CAMP_REQ message sent by GMM Layer 804 has been received by RR Layer 802, RR Layer 802 camps-on (i.e., locks on, or tunes its receiver) to that frequency identified by the PLMN ID sent in step 1108. This occurs in step 1110, when RR Layer 802 has acquired A-BCCH 9. Then, in step 1112, RR Layer responds to GMM Layer 804 with an GMMRR_CAMP_CNF message, which indicates a "camp-on" confirmation. It may, of course, also be the case that RR layer 802 could not camp on the preferred channel, and this information would also be relayed to GMM Layer 804. GMM Layer 804 then enters the GMM-Dereg_Normal Service state in step 1114. This means that access terminal 20 could acquire "normal" service from EGW 8, if desired, but, that it is still de-registered with regards to NGW 12, which is the provider of new services access terminal 20 desires. The movement of GMM layer 804 from GMM-Dereg PLMN Search state to GMM-Dereg_Normal Service state occurs because the channel camped by RR layer 802 is not on a forbidden channel list.

In step 1116, GMM Layer 804 "decides" that an "attach" (i.e., "attach procedure") is needed to NGW 12. This step may be the result of a user depressing a button on access terminal 20, or through various other mechanisms including voice recognition software indicted a desire to acquire some new service. The attach request is sent to RR Layer 802, through steps 1118A and 1118B. Steps 1118A and 1118B represent the passing of an attach request message from GMM layer 804 to logical link (LL) layer 803. LL layer 803 receives the attach request message, which is in the form of a GMM packet data unit (PDU), and breaks it into one or more smaller LL layer PDUs, which RR layer 802 is better able to receive and comprehend. In step 1122, dark beam activation take place. Step 1122 represents the protocol steps described more fully in related application, Ser. No. 10/83, 838, "DARK BEAM OPERATION SCENARIO". As part of step 1122, RR layer 802 stores the LL layer PDU and attempts to set up a connection before sending the LL layer 803 PDU to NGW 12. If the access terminal access class is not blocked, then RR layer 802 will proceed with the aforementioned dark beam activation procedure. Eventually, T-BCCH 11 is illuminated, as shown in step 1124.

Simultaneously with step 1122 (Dark Beam activation), GMM Layer 804 enters a GMM-Registered-Initiated state in step 1120. GMM layer 804 starts timer T3310 as soon as it enters the GMM Registered Initiated state. This means that access terminal 20 is neither registered nor de-registered; it is "in between" services of EGW 8 and NGW 12.

In step 1126, RR layer 802 discards the LL layer PDU, switches to T-BCCH 11 frequency (the frequency information obtained from system information transferred to it during step 1122, Dark Beam activation) and decodes the system information contained in the T-BCCH 11 system information messages carried in T-BCCH 11 transmission. In step 1128, RR Layer 802 informs GMM Layer 804 of certain information that it has acquired from T-BCCH 11; this information is contained in a GMMRR_Camp_Ind message. RR layer 802 sends a simplified PLMN list (which includes both the home PLMN and the cooperative network PLMN) and the RAI of NGW 12. RR layer 802 will ignore any further attach requests from GMM layer 804 while timers T3310 and T3311 are expired and timer T3115 is still running. The information transmitted to GMM layer 804 also indicates a successful camp-on of T-BCCH 11. In step 1130, GMM Layer returns a GMMRR_Camp_Req message to RR Layer 802. Thereafter, GMM Layer 804 enters a GMM-Dereg-PLMN-Search state in step 1132. The decision to transition to any new PLMN is made by GMM layer 804 in a PLMN Search sub-state.

In step 1134, GMM Layer 804 receives GMMRR-_Camp_CFM message from RR Layer 802, which is a confirmation that "camp-on" has occurred. Thereafter, in step 1136, GMM Layer 804 enters the GMM-Dereg_Normal Service state. This has the effect of informing RR layer 802 to initiate an attach to NGW 12. After this message is sent to RR layer 802 from GMM layer 804, GMM layer 804 will enter the GMM-Dereg. Attach Needed state. Then, in step 1138, an attach procedure occurs, attempting to attach access terminal 20 to NGW 12. In step 1138, while RR layer 802 is attempting to attach to NGW 12, GMM layer 804 enters a GMM-Registered Initiated state. As a result of the successful attach procedure in step 1138, GMM layer 804 begins the process of residing in GMM-Reg-Normal-Service state (step 1140). In step 1142, RR layer 802 transmits channel request type 1, with establishment cause "Attach/RAU". Then, after a connection has been established (step 1144) with NGW 12, RR layer 802 passes the LL layer PDU which contains the GMM PDU to NGW 12. This occurs in step 1144.

In step 1148, an attach accept message is received by RR layer 802 and is passes to GMM layer 804. GMM layer 804 will then stop timer T3310, and completes the process of moving from a de-registered to a registered state. GMM layer 804 informs RR layer 802 of successful registration in step 1150. Periodically, thereafter, spot beam reselection is started. Here, access terminal 20 is in communication with NGW 12, via T-BCCH 11, and is acquiring new services.

Figure 10:
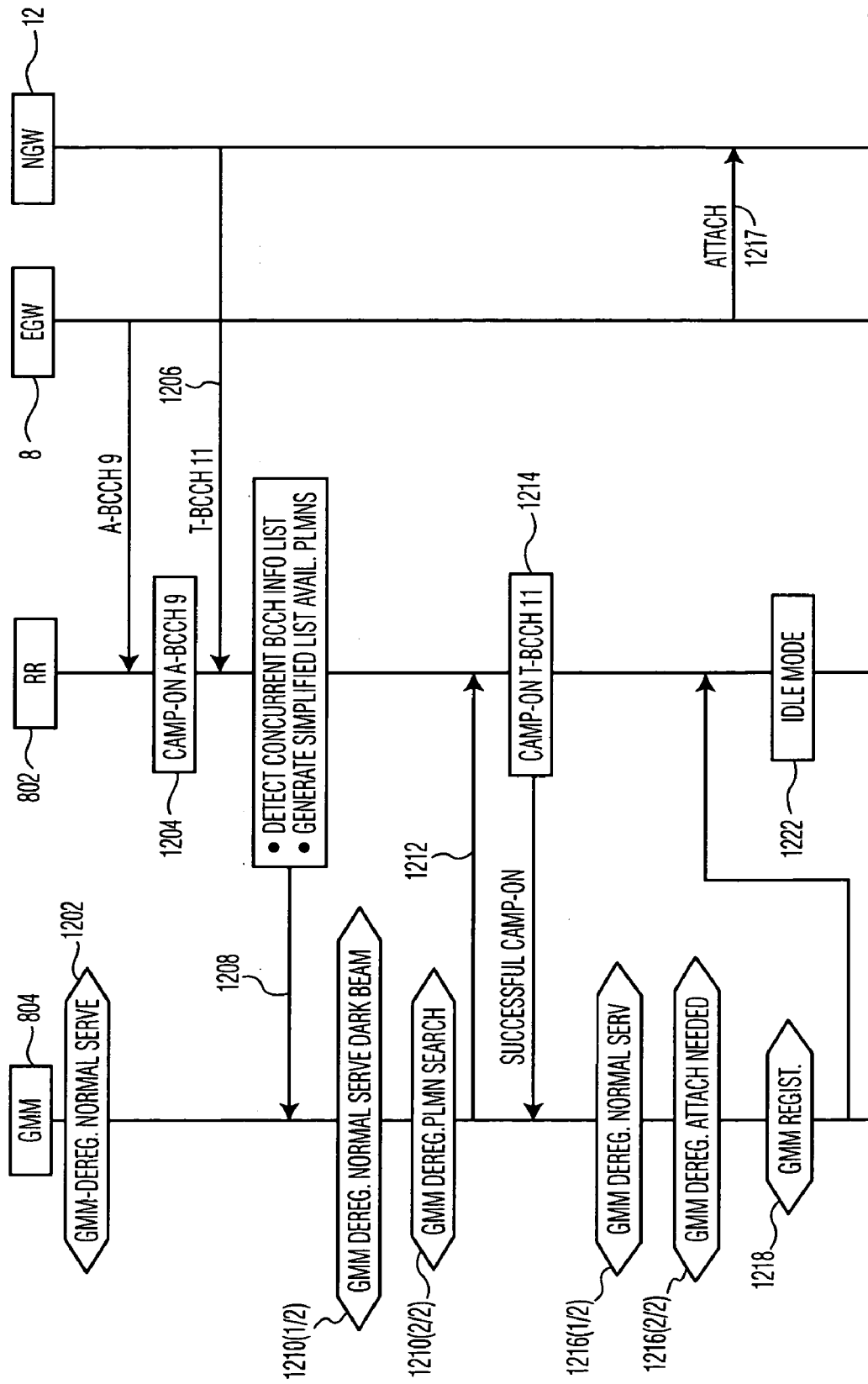
FIG. 10 illustrates a signal flow diagram of the interaction between a GMPRS mobility management software layer and a radio resource software layer of a non-registered access terminal during successful illumination of a dark beam by a different non-registered access terminal in accordance with an embodiment of the invention.

FIG. 10 illustrates a signal flow diagram of the interaction between a GMPRS mobility management software layer and a radio resource software layer of a non-registered access terminal during successful illumination of a dark beam by a different non-registered access terminal in accordance with an embodiment of the invention. The method of FIG. 10 begins with step 1202 in which GMM layer 804 of a non-registered access terminal stays in a GMM-Deregistered Normal Service Dark Beam state. Then in step 1204 RR layer 802 camps-on an A-BCCH 9 transmitted from a cooperative network (EGW 8).

In step 1206, the dark beam is illuminated by other user and the Concurrent BCCH Info List on the A-BCCH 9 is updated. In step 1208, RR layer 802 performs several actions:

(1) RR layer 802 detects the update of concurrent BCCH info list;
(2) RR layer 802 generates a simplified list of available PLMNs using the updated Concurrent BCCH Info list; and
(3) RR layer 802 provides the list of available PLMNs to GMM layer 802.

In step 1210, while GMM layer 804 is in a GMM-Deregistered Normal Service Dark Beam state, GMM layer 804 detects a beam illumination event based on the received PLMN list, updates the stored PLMN list using the received list, and transitions to a GMM-Deregistered PLMN Search state. In step 1212, GMM layer 804 prioritizes the updated PLMN list and transmits a message to RR layer 802 directing it to camp on the T-BCCH 11 associated with the preferred PLMN, which is the user's home PLMN in this case.

In step 1214 RR layer 802 camps on T-BCCH 11 according to the GMM layer 804 direction transmitted in step 1212, and then, in step 1216, informs GMM layer 804 of the successful camp-on result, and waits for further GMM layer 804 instruction. In step 1216, GMM layer 804, knowing that camp-on was successful, initiates an attach request procedure to NGW 12 (step 1217), by transitioning from the GMM-Deregistered Normal Service state to a GMM-Deregistered Attach Needed state. In step 1218, GMM layer 804 transitions to the registered side.

In step 1220 GMM layer 804 indicates to the RR layer 802 of the successful attach, and RR layer 802, in step 1222, transitions to idle mode and performs periodic beam reselection.

Figure 11:
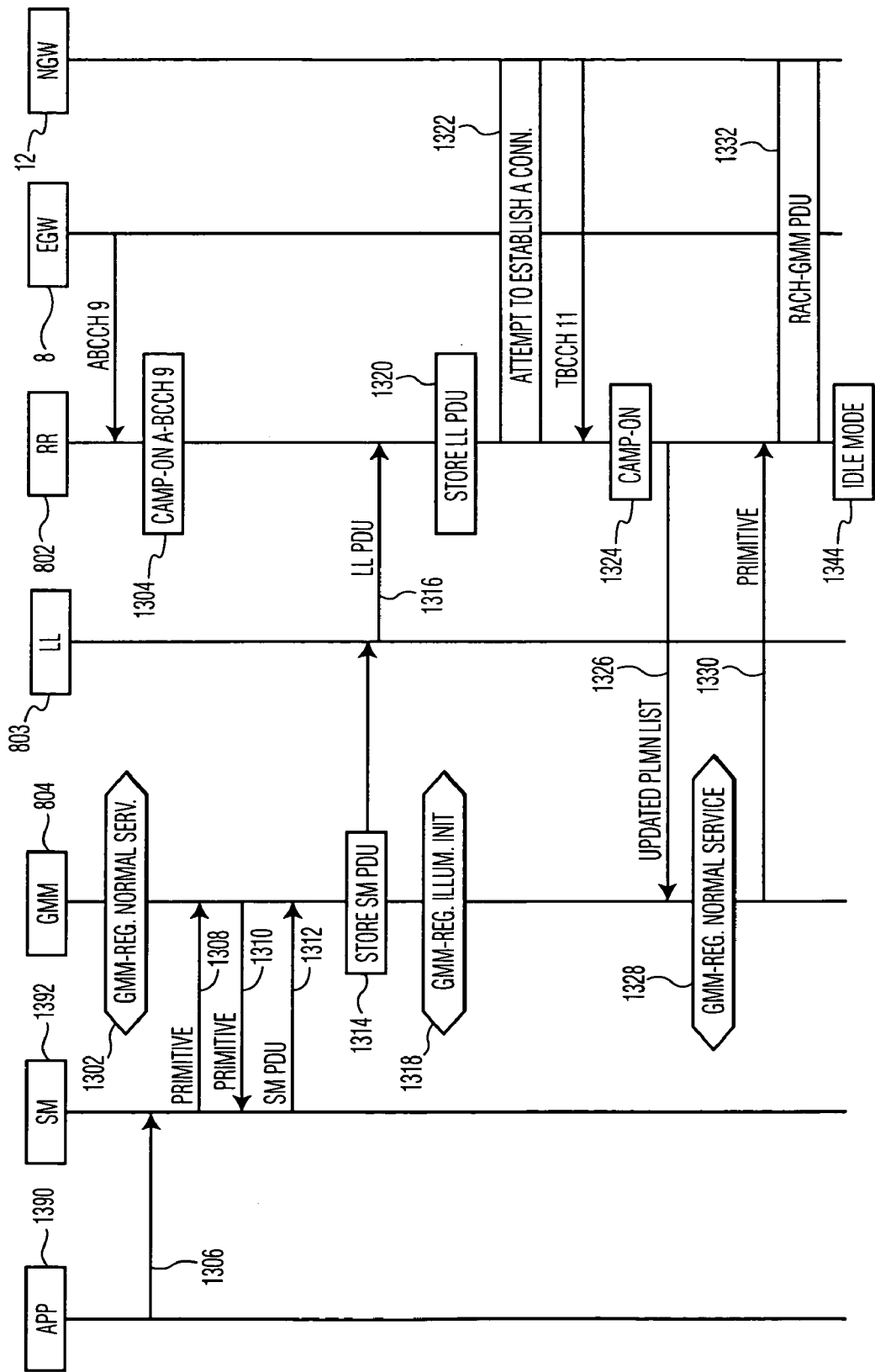
FIG. 11 illustrates a signal flow diagram of the interaction between a GMPRS mobility management software layer and a radio resource software layer of a registered access terminal requesting new services while in a dark beam in accordance with an embodiment of the invention.

FIG. 11 illustrates a signal flow diagram of the interaction between a GMPRS mobility management software layer and a radio resource software layer of a registered access terminal requesting new services while in a dark beam in accordance with an embodiment of the invention. The method of FIG. 11 begins with step 1302 in which GMM layer 804 of a registered access terminal 20 remains in a GMM Normal service Dark Beam state. In step 1304, RR layer 802 camps-on the A-BCCH 9 transmitted from a cooperative (EGW 8) network.

In step 1306 application layer 1390 transmits a message to SM layer 1392 directing it to establish a session for uplink N-PDU transfer. An uplink N-PDU transfer is a data block containing a number of user information bytes to be transmitted from the terminal to the network side. These include email, FTP data, and other items. In steps 1308 and 1310, SM layer 1392 (of access terminal 20) exchanges control messages (also referred to as primitives, having a predefined format) with GMM layer 804 to confirm that access terminal 20 is GPRS attached. In this case, positive confirmation is received.

In step 1312, SM layer 1392 creates an SM PDU and passes it to GMM layer 804, asking GMM layer 804 to transfer this message to network SM layer 1304. In step 1314, GMM layer 804 stores the SM PDU, and then passes it to LL layer 803 wherein the GMM PDU is converted to a LL layer PDU. In step 1316, LL layer 803 delivers the LL layer PDU to RR layer 802 and directs RR layer 802 to pass the LL layer PDU to the network GMM layer. In step 1318, GMM layer 804 moves to the GMM Registered Illumination Initiated state.

In step 1320, RR layer stores the LL layer PDU and in step 1322, attempts to setup a connection before sending the LLC PDU to NGW 12. RR layer 802 transmits an attach request message on RACH 19', with establishment cause "Packet Service Request" to illuminate the dark beam. If the dark beam is successfully illuminated, RR layer 802 does not initiate any further connection setup actions, and in step 1324 camps-on T-BCCH 11, extracting system information. In step 1326, RR layer 802 provides an updated PLMN list to GMM layer 804.

In step 1328, GMM layer 804 moves from the GMM-Registered Illumination Initiated Dark Beam state to a GMM-Registered Normal Service state. Simultaneously, in step 1330, GMM layer 804 will transmit a primitive to RR layer 804, which directs RR layer 802 to setup a connection, and to pass the GMM PDU (containing SM PDU) to NGW 12. In step 1332, RR layer 804 initiates RACH process and establishes a connection with NGW 12, passing the stored GMM PDU to it. Once the connection is established, RR layer 802 moves back to an idle state, while GMM layer 804 remains in the GMM-Registered Normal Service state.

Figure 12:
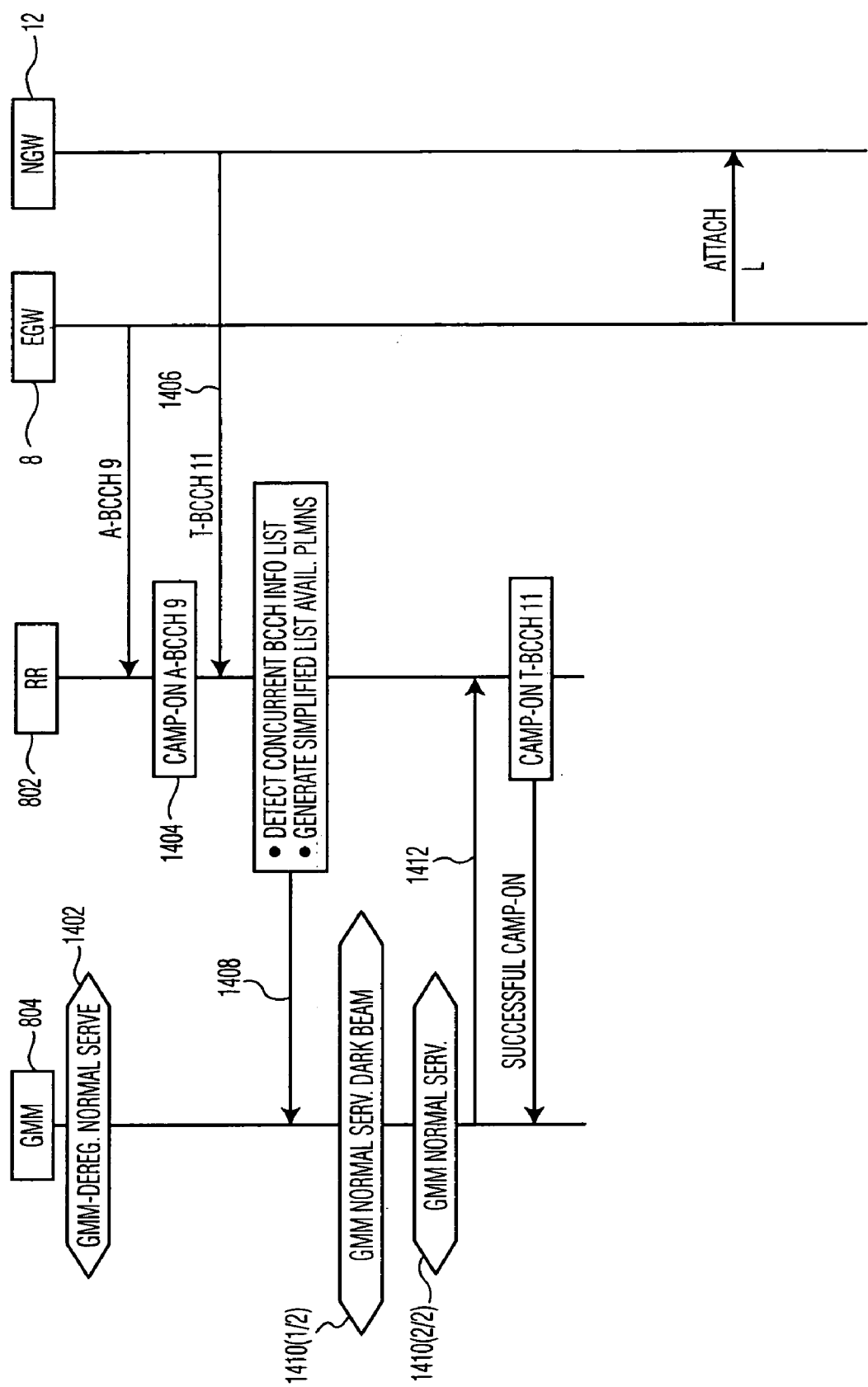
FIG. 12 illustrates a signal flow diagram of the interaction between a GMPRS mobility management software layer and a radio resource software layer of a registered access terminal during successful illumination of a dark beam by a different non-registered access terminal in accordance with an embodiment of the invention.

FIG. 12 illustrates a signal flow diagram of the interaction between a GMPRS mobility management software layer and a radio resource software layer of a registered access terminal during successful illumination of a dark beam by a different non-registered access terminal in accordance with an embodiment of the invention. The method of FIG. 12 begins with step 1402 in which GMM layer 804 of a registered access terminal stays in a GMM-Registered Normal Service Dark Beam state. Then in step 1404 RR layer 802 camps-on an A-BCCH 9 transmitted from a cooperative network (EGW 8).

In step 1406, the dark beam is illuminated by other user and the Concurrent BCCH Info List on the A-BCCH 9 is updated. In step 1408, RR layer 802 performs several actions:

(1) RR layer 802 detects the update of concurrent BCCH info list;
(2) RR layer 802 generates a simplified list of available PLMNs using the updated Concurrent BCCH Info list; and
(3) RR layer 802 provides the list of available PLMNs to GMM layer 802.

In step 1410, while GMM layer 804 is in a GMM-Registered Normal Service Dark Beam state, GMM layer 804 detects a beam illumination event based on the received PLMN list, updates the stored PLMN list using the received list, and transitions to a GMM-Registered Normal Service state. In step 1412, GMM layer 804 prioritizes the updated PLMN list and transmits a message to RR layer 802 directing it to camp on the T-BCCH 11 associated with the preferred PLMN, which is the user's home PLMN in this case.

In step 1414 RR layer 802 camps on T-BCCH 11 according to the GMM layer 804 direction transmitted in step 1412, and then, in step 1416, informs GMM layer 804 of the successful camp-on result, and waits for further GMM layer 804 instruction.

Figure 13:
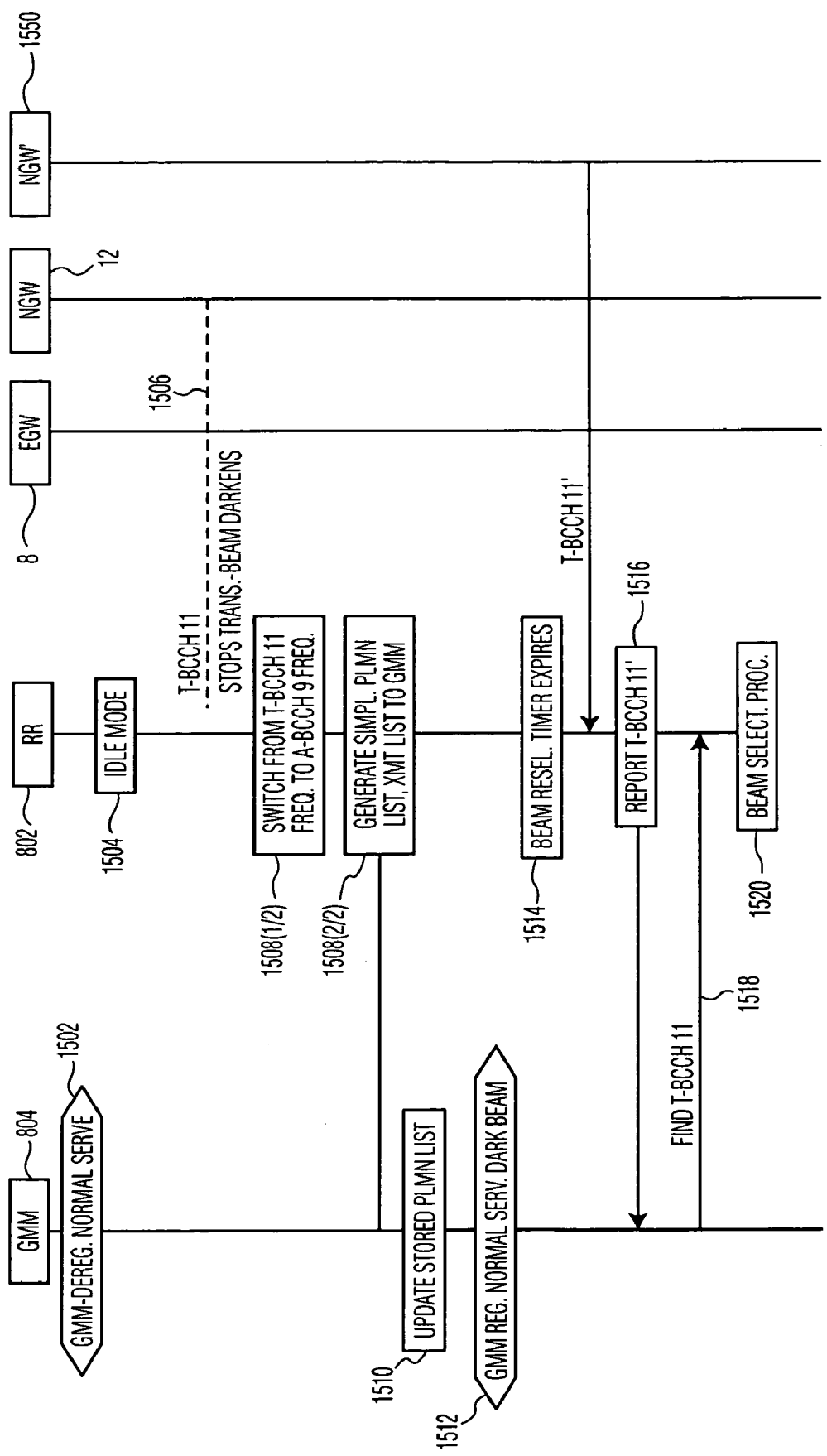
FIG. 13 illustrates a signal flow diagram of the interaction between a GMPRS mobility management software layer and a radio resource software layer of a registered access terminal during darkening of an illuminated spot beam by a registered access terminal in accordance with an embodiment of the invention.

FIG. 13 illustrates a signal flow diagram of the interaction between a GMPRS mobility management software layer and a radio resource software layer of a registered access terminal during darkening of an illuminated spot beam by a registered access terminal in accordance with an embodiment of the invention. The method of FIG. 13 begins with step 1502 in which GMM layer 804 of a registered access terminal, while in an illuminated beam, occupies a GMM-Registered Normal Service state. In step 1504 RR layer 802, while in an illuminated beam, remains in idle mode, and periodically performs beam reselection.

In step 1506, a beam darkening event is detected by RR layer 802, and RR layer 802, in step 1508, does the following: switches from the T-BCCH 11 carrier frequency to an A-BCCH 9 transmitted from a cooperative network (EGW 8) (½); and generates a simplified PLMN list (from information received from the A-BCCH 9 camped on in step 1508 (½)) and provide the list to GMM layer 804 (²/₃).

In response, in step 1510, GMM layer 804 updates its stored PLMN list, and makes a beam darkening decision. As a result, in step 1512, GMM layer 804 moves from a GMM-Registered Normal Service states to a GMM-Registered Normal Service Dark Beam state.

There are at least two possible scenarios for what occurs next to access terminal 20. First is that there may be an illuminated neighboring dark beam which access terminal 20 may wish to make use of. But, in this instance, RR layer 802 will not perform any beam reselection procedures at the time of switch over. It is not until the expiry of a beam reselection timer (optional step 1514) when access terminal 20 will discover the illuminated neighbor beam, from NGW 1550, T-BCCH 11', and report it to GMM layer 804 (optional step 1516). Therefore, in case there is illuminated neighbor, it takes a little while for access terminal 20 to discover the neighboring illuminated dark beam.

Another possible scenario is that a race condition may occur. A race condition occurs when T-BCCH 11 disappears but the BCCH Concurrent Info list is not updated. In this case, GMM layer 804 will command RR layer to go back to T-BCCH 11 in optional step 1518. RR layer 802, having found that T-BCCH 11 is not there, will start the beam selection process (optional step 1520). The beam selection process may have to be repeated several times until eventually RR layer 804 can acquire a stable A-BCCH 9.

The present invention has been described with reference to certain exemplary embodiments thereof. However, it will be readily apparent to those skilled in the art that it is possible to embody the invention in specific forms other than those described of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for establishing communications between an access terminal and a new service provider, through the distribution of information and data between a radio resource layer and a mobility management layer of the access terminal, in a satellite communications system, comprising the steps of:

camping on a broadcast channel from an existing service provider;

transmitting an attach request from the mobility management layer to the radio resource layer;

performing a dark beam activation procedure by the radio resource layer;

providing system information about a temporary broadcast channel from a new service provider from the radio resource layer to the mobility management layer;

performing an attach procedure to the new service provider by the mobility management layer; and entering into a normal service state by the mobility management layer.

2. The method according to claim 1, wherein the step of camping on a broadcast channel comprises:

entering a GMM-DEREG PLMN Search state by the mobility management layer;

receiving one or more broadcast channel transmissions containing system information from the existing service provider, each broadcast channel corresponding to a different spot beam;

measuring parameters for each of the one or more broadcast channels by the radio resource layer;

passing system information contained in the one or more broadcast channels that exceeds threshold parameters for adequate reception from the radio resource layer to the mobility management layer;

receiving instructions to camp on a specific spot beam from the mobility management layer; and camping on the specific spot beam by the radio resource layer.

3. The method according to claim 2, wherein the step of camping on a broadcast channel further comprises:

sending a confirmation to the mobility management layer.

4. The method according to claim 3, wherein the step of sending a confirmation comprises:

sending a GMMRR_CAMP_CNF message to the mobility management layer from the radio resource layer.

5. The method according to claim 1, wherein the step of transmitting an attach request comprises:

entering into a GMM-DEREG Normal Service state by the mobility management layer;

entering into a GMM-DEREG Attach Needed state by the mobility management layer; and passing an attach procedure request message from the mobility management layer to the radio resource layer.

6. The method according to claim 1 wherein the step of providing system information comprises:

verifying that a temporary broadcast channel is transmitting;

obtaining system information from the temporary broadcast channel;

passing a message to the mobility management layer from the radio resource layer that contains the system information about the temporary broadcast channel;

passing a message from the mobility management layer to the radio resource layer that contains a request of the radio resource layer to camp-on a temporary broadcast channel;

entering into a GMM-DEREG PLMN Search state by the mobility management layer;

passing a message from the radio resource layer to the mobility management layer indicating that camp-on of the temporary broadcast channel has occurred; and entering into a GMM-DEREG Normal Service state by the mobility management layer.

7. The method according to claim 6, wherein the step of passing a message comprises:

the message passed from the radio resource layer to the mobility management layer is a GMMRR_CAMP_IND message.

8. The method according to claim 6, wherein the step of passing a message comprises:

the message passed from the mobility management layer to the radio resource layer is a GMMRR_CAMP_REQ message.

9. The method according to claim 6, wherein the step of passing a message comprises:

the message passed from the radio resource layer to the mobility management layer is a GMMRR_CAMP_CFM message.

10. The method according to claim 1, wherein the step of entering into a normal service state comprises:

entering into a GMM-REG Normal Service state by the mobility management layer.

* * * * *